(12) United States Patent
Brewster, Jr. et al.

(10) Patent No.: US 10,574,550 B2
(45) Date of Patent: Feb. 25, 2020

(54) METHODS AND APPARATUS FOR SCORING THE CONDITION OF NODES IN A COMMUNICATION NETWORK AND TAKING ACTION BASED ON NODE HEALTH SCORES

(71) Applicants: Herman Dean Brewster, Jr., Cicero, NY (US); Charles William English, II, Baldwinsville, NY (US); Mark Randall Wynkoop, Vernon, NY (US); Shaun Michael Burdick, Fulton, NY (US); Noel Dempsey, Brewerton, NY (US)

(72) Inventors: Herman Dean Brewster, Jr., Cicero, NY (US); Charles William English, II, Baldwinsville, NY (US); Mark Randall Wynkoop, Vernon, NY (US); Shaun Michael Burdick, Fulton, NY (US); Noel Dempsey, Brewerton, NY (US)

(73) Assignee: TIME WARNER CABLE ENTERPRISES LLC, St. Louis, MO (US)

( * ) Notice: Subject to any disclaimer, the term of this patent is extended or adjusted under 35 U.S.C. 154(b) by 1225 days.

(21) Appl. No.: 13/843,997

(22) Filed: Mar. 15, 2013

(65) Prior Publication Data

US 2014/0280899 A1 Sep. 18, 2014

(51) Int. Cl.
*G06F 15/173* (2006.01)
*H04L 12/26* (2006.01)

(52) U.S. Cl.
CPC .......... *H04L 43/0817* (2013.01); *H04L 43/50* (2013.01)

(58) Field of Classification Search
CPC .............................. H04L 43/0817; H04L 43/50

(Continued)

(56) References Cited

U.S. PATENT DOCUMENTS

2002/0133584 A1* 9/2002 Greuel ................ H04L 12/2602
709/224
2005/0267792 A1* 12/2005 Mehrotra ......... G01N 35/00871
705/7.23

(Continued)

OTHER PUBLICATIONS

C. Yang and W. Du, "Research on the health diagnosis module of large-scale clusters," Proceedings of 2012 2nd International Conference on Computer Science and Network Technology, Changchun, 2012, pp. 589-593. (Year: 2012).*

(Continued)

*Primary Examiner* — Taylor A Elfervig
(74) *Attorney, Agent, or Firm* — Straub & Straub; Michael P. Straub; Stephen T. Straub

(57) ABSTRACT

Methods and apparatus for monitoring a network and generating overall health scores for communications nodes in the network are described. A monitoring system receives information from a variety of system elements and/or devices which provide information relating to communications service. The information received by the network monitoring system includes information indicating the number of outstanding work orders issued in regard to a trouble report, signal power level variance information, signal alarm information, uncorrectable error information, correctable error information, offline device information, etc. A set of scores for a node are generated based on the different types of received information. The scores are combined using a weighted sum to generate an overall node health score. Nodes are ranked based on overall node health scores and maintenance personal can view the scores as well as the underlying information corresponding to a node to facilitate identification of possible faults.

10 Claims, 23 Drawing Sheets

(58) Field of Classification Search
USPC .......................................................... 709/224
See application file for complete search history.

(56) References Cited

U.S. PATENT DOCUMENTS

| | | | |
|---|---|---|---|
| 2009/0158189 A1* | 6/2009 | Itani ....................... | G06Q 10/06 |
| | | | 715/772 |
| 2011/0119517 A1* | 5/2011 | Beeco ................. | H04L 41/0677 |
| | | | 713/340 |
| 2012/0014277 A1* | 1/2012 | Eckley, IV ............ | H04L 43/022 |
| | | | 370/252 |

OTHER PUBLICATIONS

M. Bocca, J. Toivola, L. M. Eriksson, J. Hollmén and H. Koivo, "Structural Health Monitoring in Wireless Sensor Networks by the Embedded Goertzel Algorithm," 2011 IEEE/ACM Second International Conference on Cyber-Physical Systems, Chicago, IL, 2011, pp. 206-214. (Year: 2011).*

* cited by examiner

| FIGURE 2A |
| FIGURE 2B |
| FIGURE 2C |

METHODS AND APPARATUS FOR SCORING THE CONDITION OF NODES IN A COMMUNICATION NETWORK AND TAKING ACTION BASED ON NODE HEALTH SCORES

FIELD

Various embodiments are directed to monitoring communications systems, e.g., cable network communications systems, and, more specifically, to detecting and/or analyzing a wide variety of different types of network information to determine the condition of a node in a communications network, to generate an overall node health score, to rank nodes according to condition and/or to take one or more actions based on the condition of one or more nodes in a network.

BACKGROUND

Networks can suffer from faults which cause actual service outages, e.g., the loss of the ability to communicate data to/from a customer premise. Service outages often result in a customer reporting of service outage and/or complaint. Ideally it is desirable to detect network faults and/or poorly operating network nodes before a service outage occurs so that the network can be serviced and an outage avoided.

In order to detect faults and/or network conditions which may lead to network outages a wide variety of conditions and information are often monitored and/or gathered. Among the information which may be gathered and/or monitored include work orders issued to repair network faults and/or in response to customer complaints, communications errors detected in the network, signal levels and/or various signal alarms used to alert system maintenance personal of actual or potential problems.

While various metrics relating to actual network faults and/or errors are important, network faults and errors occur on a regular basis as part of normal operation and may not significantly degrade service to customers in many cases. Thus, while information about network faults, errors, signal conditions, etc. are useful it is easy of for maintenance personnel such as, for example, repair technicians to be overwhelmed with the large amount and types of different data about network health and conditions such that it is often difficult to prioritize the allocation of limited resources to the repair and/or maintenance of network nodes and their associated equipment, e.g., signal amplifiers, etc.

Communications networks often include multiple nodes located in different physical locations. To serve a node a technician must often visit the site of the node and/or physical equipment associated with the node that can impact communication service between the node and customer premises which are connected to the network through a particular node. This often involves sending a service truck out to the location of the network node to be serviced.

Thus, the problem of efficient resource allocation for network service is complicated by the geographic distribution of network nodes and the availability of maintenance staff and or equipment, e.g., service trucks, available in a geographic region.

From the above discussion it should be appreciated that there is a need for methods and apparatus which can take into consideration a wide variety of different sources of network node and/or condition information and rank nodes according to their overall health, e.g., ability to reliably provide communications services to customers.

In particular there is a need for methods and/or apparatus for automatically generating overall node health scores, ranking network nodes according to their health, and/or taking actions based on generated overall node health scores such as notifying maintenance personnel of such scores and/or deploying or taking of service actions based on generated overall node health scores.

It is desirable that the methods and/or apparatus be capable of taking into consideration actual detected errors. However, it is also desirable that in at least some embodiments information which does not indicate a definitive error or fault but can bring node reliability into question or be indicative of a potential future fault, also be taken into consideration when generating an overall node health score.

SUMMARY

A network monitoring system receives information from a variety of system elements and/or devices which provide information relating to communications service which is being provided in the system. Some of the information received by the network monitoring system, e.g., information indicating an outstanding work order issued in regard to a trouble report, may indicate an actual network fault or loss of service, other information received by the network monitoring system, e.g., a large variance in signal power levels to or from a household over time, may signal a potential future network fault, e.g., potential fault in a network transmitter, power amplifier or network connection but may not indicate an actual current fault or network impairing condition. Similarly, information about the number of customer premise devices detected to be offline, e.g., unreachable, from a node in the network may suggest that there may be a problem with a node. However, given that devices may be offline for any number of reasons the fact that some customer premise devices, e.g., cable set top boxes, data modems or IP phones, may be offline at any given time the number of offline devices corresponding to a network node is not a clear and definitive indication of a network fault. However, it is a factor which may be taken into consideration when attempting to rate the overall health of a node.

In accordance with various embodiments, a wide range of information from various elements in the communications system is collected and processed to generate overall node health scores for individual communications nodes in the network. The collected information is normalized, e.g., individual metrics of a particular type are presented in a manner that allows the metrics for different regions with differing numbers of customer premises and/or devices per node to be compared in a meaningful way. For some metrics, such as offline device metrics the number of offline devices which is reported is the number of devices off line per, e.g., 100 devices. Thus, in some embodiments the offline device number indicates a percentage of devices which are offline. In other cases, such as where a number of signal alarms is the metric, the number of devices used for normalization maybe higher with the number of signal alarms being on a per 1000 device basis. While different base numbers may be used for the normalization of different statistics, the base used to normalize a particular type of statistic, e.g., number of offline devices, will be the same across different nodes allowing for comparison to the statistic across different nodes in a meaningful way.

While the number of particular events has been found useful in scoring the health of a node, what is often as important or more important is how far a node deviates from the expected norm or average. Accordingly, in accordance with one embodiment, generation of scores corresponding to particular node metrics depends not only on the number reported for the particular metric during a given monitoring interval but also the value of the reported number relative to the standard deviation for that metric as determined over a period of time including multiple monitoring intervals.

In one particular exemplary embodiment a method of monitoring a communications system includes receiving information corresponding to a first node relating to a first network portion which includes customer premise devices which communicate via said first node with other devices. The node may be a node via which multiple customer premises send and/or receive information that passes through said headend, e.g., cable headend.

The received information relating to node health maybe, and in some embodiments is, from a variety of sources including, e.g., a billing system which provides open work order information, a network monitoring device which provides offline device number information, signal alarm information, etc, and error detection and correction devices, e.g., in the customer premise equipment or headend, which provide information on the number of detected correctable errors, e.g., correctable codeword or packet errors depending on the embodiment, and/or the number of uncorrectable codeword or packet errors.

Among the information used in at least one embodiment to generate an overall node health score for a node includes open work order information, e.g., a number of trouble work orders that remain open at the end of a work order monitoring interval. Cable offline information, e.g., information indicating a number of cable set top boxes that are offline, modem offline number information, e.g., information indicating a number of data modems offline, and phone offline information, e.g., information indicating a number of IP phones that are offline. The numbers may be, and in some embodiments are, provided in a normalized form, e.g., as a number of devices per 100 devices attached to the node. When the normalization is based on 100, the received number of offline devices represents the percentage of offline devices, of the type to which the offline number information corresponds, located at customer premises coupled to the node to which the information corresponds. As should be appreciated while a device may be detected to be offline, the offline condition may be due to a network fault or because the device is simply powered off. Accordingly, unusually high offline device numbers tend to be indicative of a problem but normal or usually offline numbers do not necessarily indicate a problem or network fault.

Communications error information which may be received and used for determining overall node health includes first communication error information, e.g., a number of detected uncorrectable errors and second communication error information, e.g., a detected number of correctable communication errors. As with the device number information, the error information may be based on a normalization factor, e.g., 1000 codewords or packets. For example, an uncorrectable error value of 9 would, in one embodiment, indicate that 9 uncorrectable errors were detected in 1000 codewords which were communicated via the node. The normalization factor of 1000 is merely exemplary and in other embodiments the error indicator value is per a different number of codewords or packets. While both correctable and uncorrectable errors tend to indicate a potential problem, uncorrectable errors are potentially service impacting events which can degrade the quality of service received by one or more customers. Accordingly, in assessing overall node health uncorrectable errors tend to be more important than correctable errors.

In addition to detected communications errors, in at least one embodiment the number of signal alarms, e.g., forward data channel signal alarms and reverse data channel signal alarms for a node are also taken into consideration. A signal alarm is generated in some embodiments when a signal power level between the node and a customer premise is above a first alarm threshold or below a second lower alarm threshold. While a signal alarm may indicate a possible problem, it may not indicate a loss or interruption of service. Accordingly, while signal alarms may be important to assessing node health, they may not be as important as uncorrectable errors. Signal alarm cable percentage is the percentage of set top box devices that show signal alarms as compared to the total number of set top boxes. Signal alarm data percentage is the percentage of modems that show signal alarms as compared to the total number of set top boxes.

In addition to signal alarms which are triggered based on signal power levels, variations in signal power levels can also provide relative information about communications quality and node health. Large power swings can indicate a faulty amplifier or intermittent device. Accordingly, in addition to the other node health factors which are taken into consideration when generating an overall node health score, in some embodiments reverse data carrier signal power level variance and forward data carrier signal power level variance are taken into consideration.

From the various different types of information relating to overall node health that are received for a node, a corresponding set of node condition scores is generated. The set of node condition scores may, and in some embodiments does, include a score for each of the different types of information relating to overall node health that is received.

In some embodiments, the score for an individual node health related metric is generated based on the value of the metric for the current monitoring interval, an average value generated from information corresponding to multiple monitoring intervals, and the standard deviation of the value of the metric during the multiple monitoring intervals. Thus, the score is based on the current metric value taking into consideration the range the value may extend over a period of time including multiple monitoring intervals.

From the scores in the set of node condition scores an overall node health score is generated. The overall node health score provides a single value indicative of overall node health. In some embodiments the overall node health score is a weighted sum of the node condition scores corresponding to the node to which the overall node health score corresponds. The weighted sum may, and in some embodiments is, a weighted average.

In generating the overall node health score, in at least some embodiments, individual node condition scores are weighted in a manner that reflects their probability that the condition to which the score corresponds will adversely affect a customer's perceived quality of service. Thus, in at least some embodiments the score corresponding to uncorrectable errors is weighted more heavily, e.g., 15 times more heavily, than the node condition score of the lowest importance to overall node health. In some embodiments the signal variance scores are weighted by a factor of 1 since signal variance is likely to have little impact on perceived communications quality. Other scores, e.g., a device offline score, open trouble work order score and correctable error score may be weighted evenly, e.g., by using a multiple of 10 in some embodiments.

Overall node health scores are generated for multiple nodes. When a node health score is of a level that indicates a potential problem, e.g., is above a threshold used to trigger notification of a maintenance person in an embodiment where higher overall node health scores indicate lower node health than lower number overall health scores.

In some embodiments nodes are ranked based on their overall node health scores. The ranking may be according to system regions, e.g., with the region with the node having the lowest health as indicated by a high overall node health score being listed at the top of a node list. In addition, within a region nodes may be ranked according to overall node health scores.

A user can click on a displayed score or otherwise select an overall node health score to gain access, e.g., be presented with, the scores and underlying information which contributed to the overall node health score. From the node condition scores the maintenance person can readily identify possible reasons and/or contributing factors which contributed to the health score thereby facilitating a determination of the type of service that may be required and efficient deployment of available maintenance resources.

For example, a high offline number of IP telephones may indicate a problem with equipment used to support IP telephones while a high number of offline cable set top boxes may indicate a problem with equipment used to provide video services. Similarly a high reverse data channel signal variance may indicate a problem with customer premise transmitters or an upstream amplifier between the customer premises and the node while a high forward data channel signal power level variance may indicate a problem with a downstream power amplifier or transmitter in the node used to transmit signals to customer premise devices.

By allowing a maintenance person the ability to easily rank nodes and to identify sources of power node health available network maintenance resources can be deployed in an efficient and timely manner designed to avoid and/or minimize network outages while providing a quality customer experience.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

DETAILED DESCRIPTION

Figure 1:
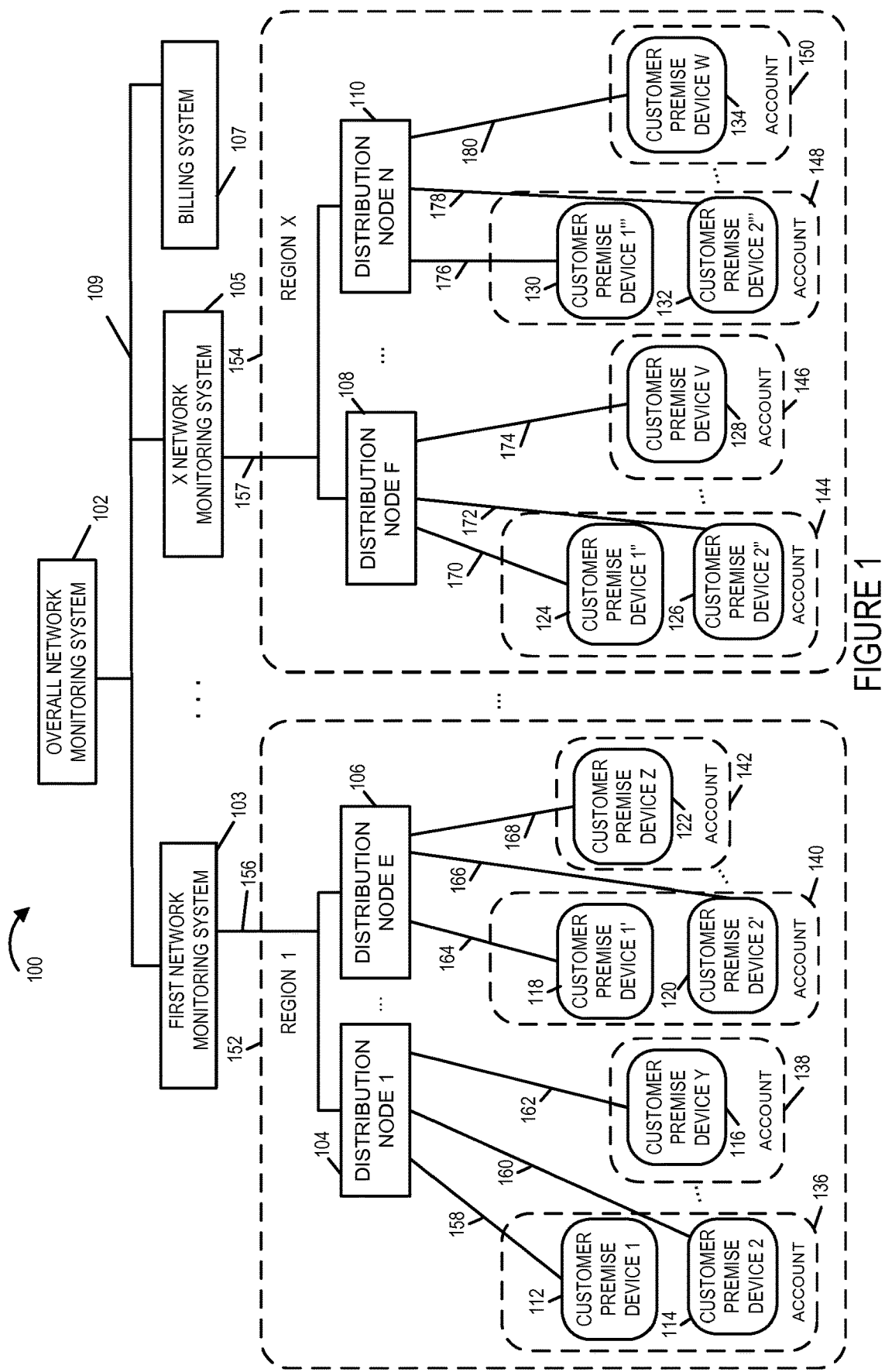
FIG. 1 is a drawing of an exemplary communications system, e.g., a cable network communications system, including fluctuation detection and analysis in accordance with an exemplary embodiment.

FIG. 1 is a drawing of an exemplary communications system 100, e.g., a cable network communications system, including overall network monitoring and analysis in accordance with an exemplary embodiment. Exemplary communications system 100 includes an overall network monitoring system 102, a billing system 107, a plurality of network monitoring systems, a plurality of distribution nodes, and a plurality of customer premise devices. In exemplary system 100 there are a plurality of regions (region 1 152, . . . , region X 154) In region 1 152, there are a plurality of distribution nodes (distribution node 1 104, . . . , distribution node N 106) which are coupled to a first network monitoring system 103, e.g., region 1 network monitoring system. In region 1 152, there are a plurality of customer premise devices (customer premise device 1 112, customer premise device 2 114, . . . , customer premise device Y 116) coupled to distribution node 1 104 via links (158, 160, . . . , 162), respectively. In region 1 152, there are a plurality of customer premise devices (customer premise device 1' 118, customer premise device 2' 120, . . . , customer premise device Z 122) coupled to distribution node N 106 via links (164, 166, . . . , 168), respectively. In region X 154, there are a plurality of distribution nodes (distribution node 1' 108, . . . , distribution node M 110) which are coupled to X network monitoring system, e.g., region X networking system. In region X 154, there are a plurality of customer premise devices (customer premise device 1" 124, customer premise device 2" 126, . . . , customer premise device V 128) coupled to distribution node 1' 108 via links (170, 172, . . . , 174), respectively. In region X 154, there are a plurality of customer premise devices (customer premise device 1'" 130, customer premise device 2'" 132, . . . , customer premise device W 134) connected to distribution node M 110 via links (176, 178, . . . , 180), respectively. Distribution nodes (104, . . . , 106) in region 1 are coupled to first network monitoring system 103 via link 156. Distribution nodes (108, . . . , 110) in region X are coupled to X network monitoring system 105 via communication link 157. The first network monitoring system 103, . . . , X network monitoring system, and billing system 107 are coupled to an overall network monitoring system 102 via communication link 109. In at least some embodiment, the communication link 156, . . . , 157 are a single communications link that forms part of a network that couples the plurality of distribution nodes to the plurality of network monitoring systems. In some embodiments the communication links 109, 156, and 157 are a single communications link that forms a network that coupling the overall network monitoring system, the plurality of network monitoring systems, the billing system, and the plurality of distribution nodes together so that they can exchange information.

One or more customer premise devices are grouped to the same account. For example, a single account may correspond to one or more customer premise devices at the same location, e.g., the same house or apartment. In this example, customer premise device 1 112 and customer premise device 2 114 correspond to account 136; customer premise device Y corresponds to account 138; customer premise device 1' 118 and customer premise device 2' 120 correspond to account 140; and customer premise device Z 122 corresponds to account 142. In this example, customer premise device 1" 124 and customer premise device 2" 126 correspond to account 144; customer premise device V 128 corresponds to account 146; customer premise device 1'" 130 and customer premise device 2'" 132 correspond to account 148; and customer premise device W 134 corresponds to account 150. Exemplary customer premise devices include set top boxes, cable modems, and digital phones.

An individual customer premise device performs measurements, e.g., forward data carrier (FDC) and return data carrier (RDC) level measurements, with regard to signals being received from/transmitted to the distribution node to which it is connected. The individual customer premise device also performs forward error correction (FEC) of encoded data received and generates forward error correction information, e.g., number of FEC codewords corrected and FEC codewords uncorrectable over a specified period of time. In various embodiments, one or more different types of measurements are performed in accordance with a schedule, e.g., a predetermined schedule, and/or in response to a command to perform additional diagnostic measurements. Similarly measurements of the number of FEC corrected codewords and uncorrectable codewords is determined in accordance with a schedule, e.g., a predetermined schedule, and/or in response to a command to perform diagnostic measurements. Measurement data collected by a customer premise device, corresponding to a plurality of measurement times, is reported to the network monitoring system. The network monitoring system identifies which customer premise devices are connected to which distribution nodes, and aggregates collected information from the customer premise devices connected to the same distribution node. The network monitoring system generates, for the distribution node to which it is connected, a set of data used to evaluate various conditions concerning the health of the node. Exemplary data generated used to evaluate the health of the node include: offline device information, signal level variance information, signal alarm information, and communication error information.

Exemplary offline device information includes the number of offline devices out of total devices by device type and as a percentage during an offline time period. E.g., cable offline percentage (COP) is the percentage of set top box devices that are offline during a cable set top box time period as compared to the overall total of set top box devices; phone offline percentage (POP) is the percentage of digital phone devices that are offline during a digital phone offline time period as compared to the total number of digital phone devices; and modem offline percentage (MOP) is the percentage of modem devices that are offline during a modem offline time period as compared to the total number of modem devices. In most, but not all, embodiments a single offline device time period is used instead of different offline time periods for different device types.

Exemplary signal level variance information includes the amount of forward data carrier (FDC) level variance for customer premise devices, such as cable modems and/or set top boxes, as measured over a period of time and the amount of return data carrier (RDC) level variance for customer premise devices, such as cable modems and/or set top boxes, as measured over a period of time. Signal level variance is sometimes referred to as the level of signal fluctuation and/or power level fluctuation of a signal. In some embodiments, the measurement time period is the same for the FDC level variance and RDC level variance measurements. In such embodiments when the time measurement period is 6 hours, the signal level variance is sometimes referred to as FDC6 and RDC6 level variances.

Exemplary signal alarm information includes: the percentage of set top box devices that show signal alarms as compared to the total number of set top box devices on the node as measured over a period of time such as a day and the percentage of modems that show signal alarms as compared to the total number of modems on the node as measured over a period of time such as a day. In some embodiments, a signal alarm occurs when a set top box device and/or modem experiences a flux violation causing an alarm. A flux violation occurring for example when the measured forward data carrier signal level or return data carrier signal level for the device fluctuates above a first predefined level or below a second predefined level. In some embodiments the number of devices of a particular device, e.g., modem or set top box is used as alarm information as opposed to a percentage.

Exemplary communication error information includes the percentage of the number of forward error correction codewords that were corrected as compared to the total number of codewords as measured over an error measurement time period and the percentage of the number of forward error correction codewords that were uncorrectable as compared to the total number of codewords as measured over an error measurement time period. The error measurement time period for the corrected codewords and uncorrectable codewords typically being the same.

Figure 13:
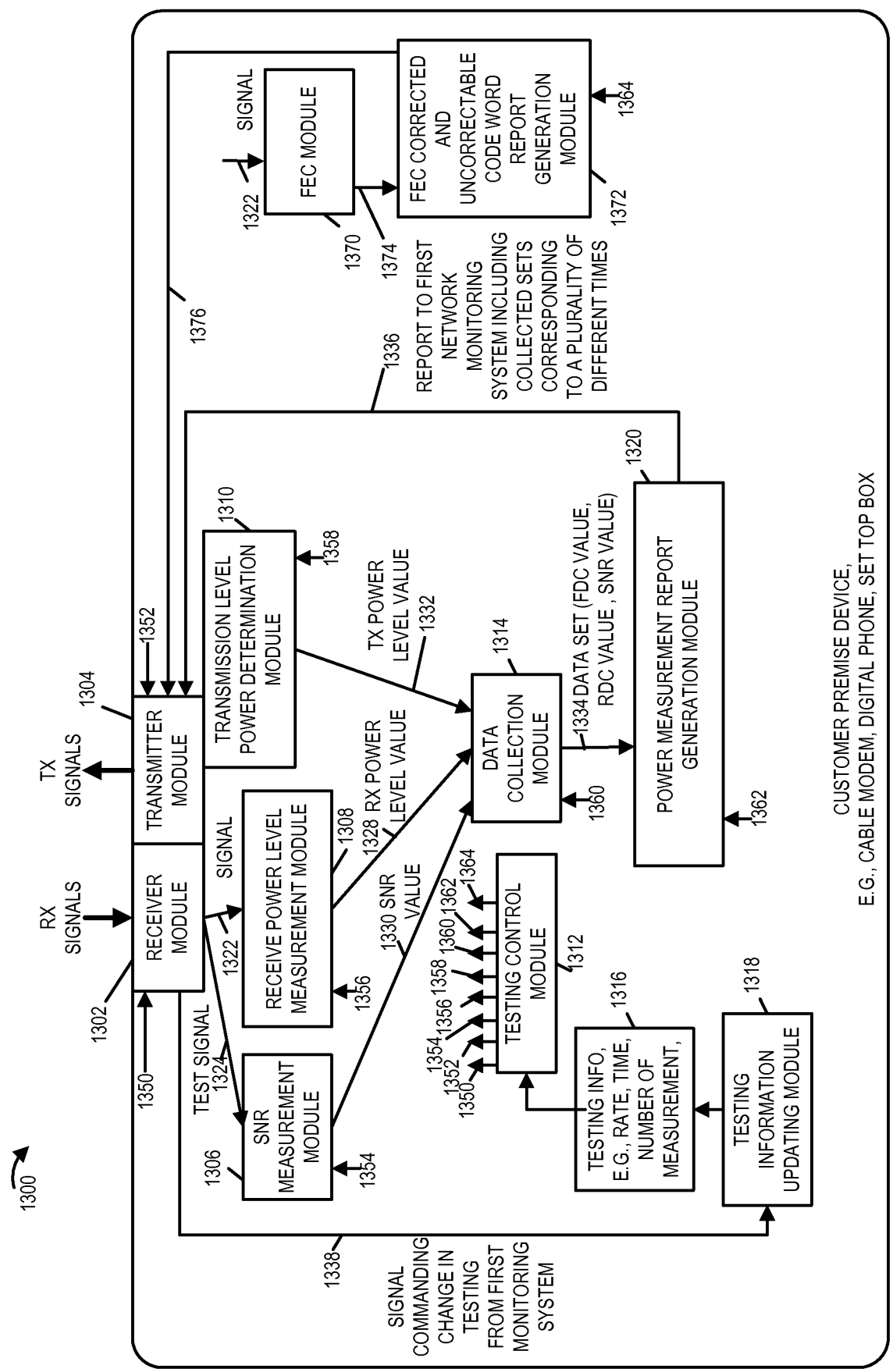
FIG. 13 is a drawing of an exemplary customer premise device, e.g., a set top box, cable modem or digital phone, in accordance with an exemplary embodiment.

FIG. 13 is a drawing of an exemplary customer premise device 1300, e.g., a set top box, cable modem or digital phone, in accordance with an exemplary embodiment. Customer premise device is, e.g., one of the customer premise devices of system 100 of FIG. 1. Customer premise device 1300 includes a receiver module 1302, a transmitter module 1304, an SNR measurement module 1306, a receive power level measurement module 1308, a transmission power determination module 1310, a testing control module 1312, a data collection module 1314, testing information 1316, a testing information updating module 1318, a power measurement report generation module 1320, a forward error correction (FEC) module 1370, and a FEC corrected and FEC uncorrected code word report generation module 1372.

Testing information 1316 includes, e.g., testing rate information, testing time information, information identifying which particular measurements are to be performed, information identifying the number of measurements to be performed, testing schedule information. The testing information 1316 is used by the testing control module 1312 to generate controls signals (1350, 1352, 1354, 1356, 1358, 1360, 1362, and 1364) to control the operation of the various modules (1302, 1304, 1306, 1308, 1310, 1314, 1320, 1372), respectively. While in advanced customer premise devices the testing control module may control the implementation of multiple tests according to a schedule, in many embodiments the testing control module responds to instructions and/or requests that specific tests be performed with the test results then being sent to the transmitter module for reporting to the network monitoring system e.g., server, for the node to which the customer premise device is connected. For example, the testing control module of customer premise device 1 112 responds to instructions and/or requests from the first network monitoring system 103 while the customer premise device 1" 124 responds to instructions and/or requests from X monitoring system 105.

In embodiments where the customer premise device simply responds to SNMP requests, the network monitoring system can control the scheduling, times, and/or rate of such tests by sending out SNMP requests for transmit, receive and/or SNR level information in accordance with the desired schedule, times and/or rate at which such information is to be collected from a device. Thus, in such embodiments the network monitoring system controls the polling of the customer premise devices avoiding the customer premise devices having to collect and aggregate power measurements and communication error information over an extended time period, e.g., hours or days according to a schedule stored in or supplied to the customer premise device. As should be appreciated, whether the aggregation and storage of multiple power level measurements and/or communication error information occurs in the customer premise device and are reported up to the network monitoring system in a single message or test results corresponding to each individual time period are sent separately may depend on the particular embodiment and/or the capabilities of the customer premise devices.

The polling rate and/or tests performed by the individual customer premise devices is controlled by the network monitoring system for the node to which the device is connected and can be changed in response to detection of the number of uncorrectable errors and/or detection of power fluctuation levels exceeding one or more thresholds and/or as part of automatically triggered diagnostic process with the customer premise device responding to poll requests with the requested transmit, receive, SNR level information and/or error communication information.

Transmission power level determination module 1310 determines the transmission power level of signals transmitted by transmitter module 1304. Signal 1332, generated by transmission power determination module 1310 conveys the determined TX power level value to data collection module 1314. Receive power level measurement module 1308 measures the received power of received signal 1322 received by receiver module 1302. Signal 1328, generated by receive module 1310 conveys the determined RX power level value to data collection module 1314.

SNR measurement module 1306 determines an SNR level based on received signals 1324 which includes received test signaling 1324. Signal 1330, generated by SNR measurement module 1306 conveys the determined SNR value to data collection module 1314.

The forward error correction (FEC) module receives signal 1322 from the receiver module 1302 and performs an error detection and correction operation. It provides the number of codewords received, the number of forward error correction codewords corrected and the number of forward error correction codewords that were uncorrectable to forward error correction (FEC) corrected and uncorrected codeword report generation module 1372 via signal 1374. The FEC corrected and uncorrected codeword report generation module 1372 generates a report with the total number of codewords received, the number of forward error correction codewords corrected, and the number of forward error correction codewords that were uncorrectable over the time period indicated via the test control module 1312 via signal 1364. The generated communication error report is then transmitted via signal 1376 to transmitter 1304 and to the network monitoring system, e.g., first network monitoring system 103. In some embodiments, the communication error data and/or report is generated by the power generation report module 1362 instead of the FEC report generation module 1372. In such embodiments the FEC Module 1370 sends the signal 1374 to the data collection module for inclusion in the data set being generated for the power measurement report 1320.

Data collection module 1314 collects the data and forms a data set, e.g., including a FDC value, a RDC value, and an SNR value. Data collection module 1314 sends the data set 1334 to power measurements report generation module 1320. The data collection process is performed a number of times under the control of the testing control module based on the testing information 1316.

Power report generation module 1320 generates a report 1336 directed to the network monitoring system, e.g., the first network monitoring system 103, including collected data sets corresponding to a plurality of different times. The power report generation module 1320 also adds time tag information corresponding to the data sets and information identifying the reason that the testing was performed for each set of data in the report. Report 1336 is transmitted by transmitter module 1336 and routed to the network monitoring system, e.g., network monitoring system 103 of system 100 of FIG. 1. In some embodiments, this data is then transmitted from the network monitoring system, e.g., the first network monitoring system 103 to the overall network monitoring system 102 for evaluation of the node. In some embodiments, the data set is processed, analyzed and/or evaluated by the network monitoring system 103 to generate condition scores for the node such as for example first signal alarm score for the node, signal level variance score for the node and a communication error score for the node. The scores would be based on measurement time periods. These node condition scores then being transmitted to the overall network monitoring system 102 for use in determining and ranking the node's health in comparison to the other nodes in the communications network and/or the same region of the communication network.

Customer premise device 1300 may, and sometimes does, receive a signal 1338 from the network monitoring system, e.g., first network monitoring system 103 commanding a change in the testing. Testing information updating module 1318 receives, via receiver module 1302, command signal 1338 and updates the testing information 1316 in response to the received command signal 1338. Testing control module 1312 implements the change in testing. Various exemplary commands include a diagnostic test operation, a change in the rate at which power level information is collected, a change in the number of power measurements taken during a portion of a day, a change in when the rate of reporting the communication error information.

Figure 14:
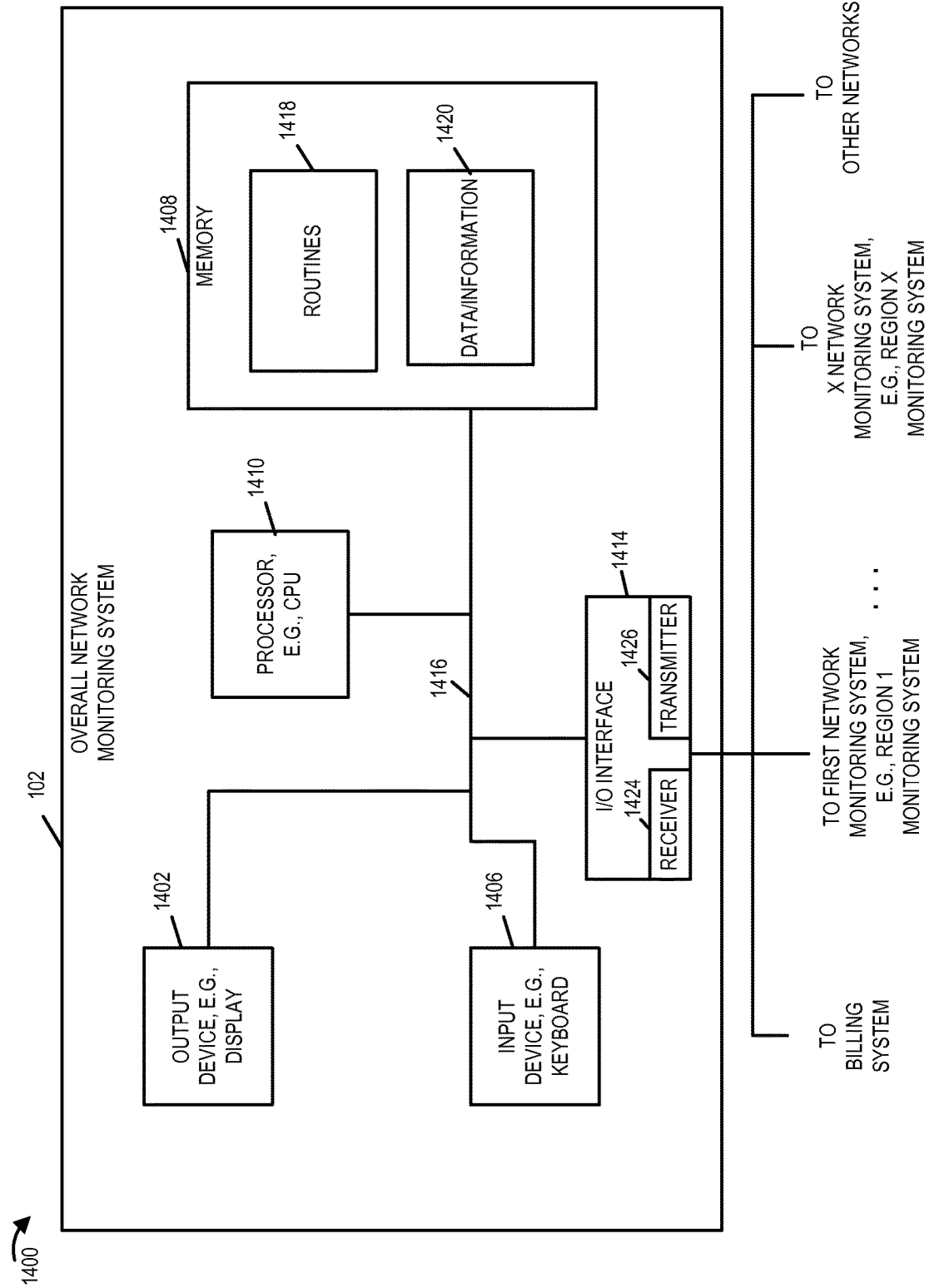
FIG. 14 is a drawing illustrating some of the details of the exemplary overall network monitoring system shown in FIG. 1, in accordance with an exemplary embodiment of the present invention.

FIG. 14 is a drawing 1400 illustrating some of the details of the exemplary overall network monitoring system 102 of communication system 100 of FIG. 1 in accordance with an exemplary embodiment of the present invention. Overall network monitoring system 102 includes an output device 1402, e.g., a display, an input device 1406, e.g., a keyboard, a processor 1410, e.g., a CPU, an I/O interface 1414, and a memory 1408. The various elements (1402, 1406, 1408, 1410 and 1414) are coupled together via a bus 1416 over which the various elements may exchange data and information. Memory 1408 includes routines 1418 and data/information 1420. The I/O interface 1414 couples the overall network monitoring system to the first network monitoring system 103, . . . , X network monitoring system 105, the billing system 107 and other networks such as for example, the Internet so that information can be exchanged between these systems and networks. The I/O interface includes transmitters and receivers for transmitting and receiving information. The processor 1410 executes the routines 1418 and uses the data/information 1420 in memory 1408 to control the overall network monitoring system and implement steps of a method, e.g., the method of flowchart 200 of FIG. 2 and/or steps of subroutines of the methods of flowcharts 300 of FIG. 3, 400 of FIG. 4, 500 of FIG. 5, 600 of FIG. 6, 700 of FIG. 7, 800 of FIG. 8, 900, of FIG. 9, 1000 of FIGS. 10, and 1100 of FIG. 11.

Figure 15:
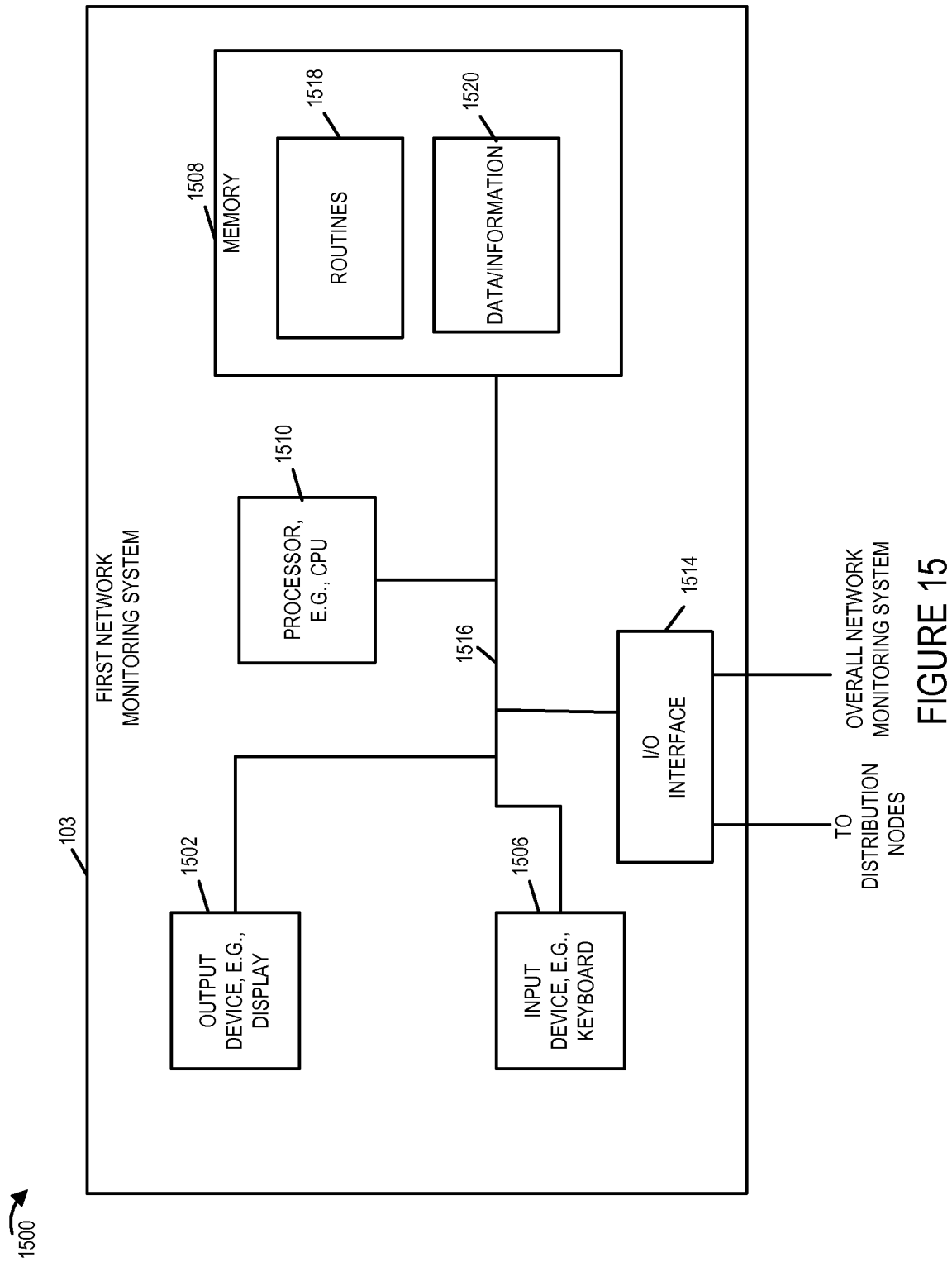
FIG. 15 illustrates some of the details of exemplary first network monitoring system of communications system of FIG. 1, in accordance with an exemplary embodiment of the present invention.

FIG. 15 is a drawing 1500 illustrating some of the details of exemplary first network monitoring system of communications system 100 of FIG. 1 in accordance with an exemplary embodiment of the present invention. The first network monitoring system 103, e.g., region 1 network monitoring system includes an output device 1502, e.g., a display, an input device 1506, e.g., a keyboard, a processor 1510, e.g., a CPU, an I/O interface 1514, and a memory 1508. The various elements (1502, 1506, 1508, 1510 and 1514) are coupled together via a bus 1516 over which the various elements may exchange data and information. Memory 1508 includes routines 1518 and data/information 1520. The I/O interface 1514 couples the first network monitoring system to the overall network monitoring system 102 the distribution nodes 1 104, . . . , E 106 of region 1. The I/O interface includes transmitters and receivers for transmitting and receiving information over communication links 109 and 156. The processor 1510 executes the routines 1518 and uses the data/information 1520 in memory 1508 to control the first network monitoring system and implement steps of a method, e.g., steps of the method of flowcharts 400 of FIG. 4, 500 of FIG. 5, 600 of FIG. 6, 700 of FIG. 7, 800 of FIG. 8, 900 of FIG. 9, 1000 of FIGS. 10, and 1100 of FIG. 11. In some embodiments, the first network monitoring system 103 is a hubsite and/or head end.

Figure 16:
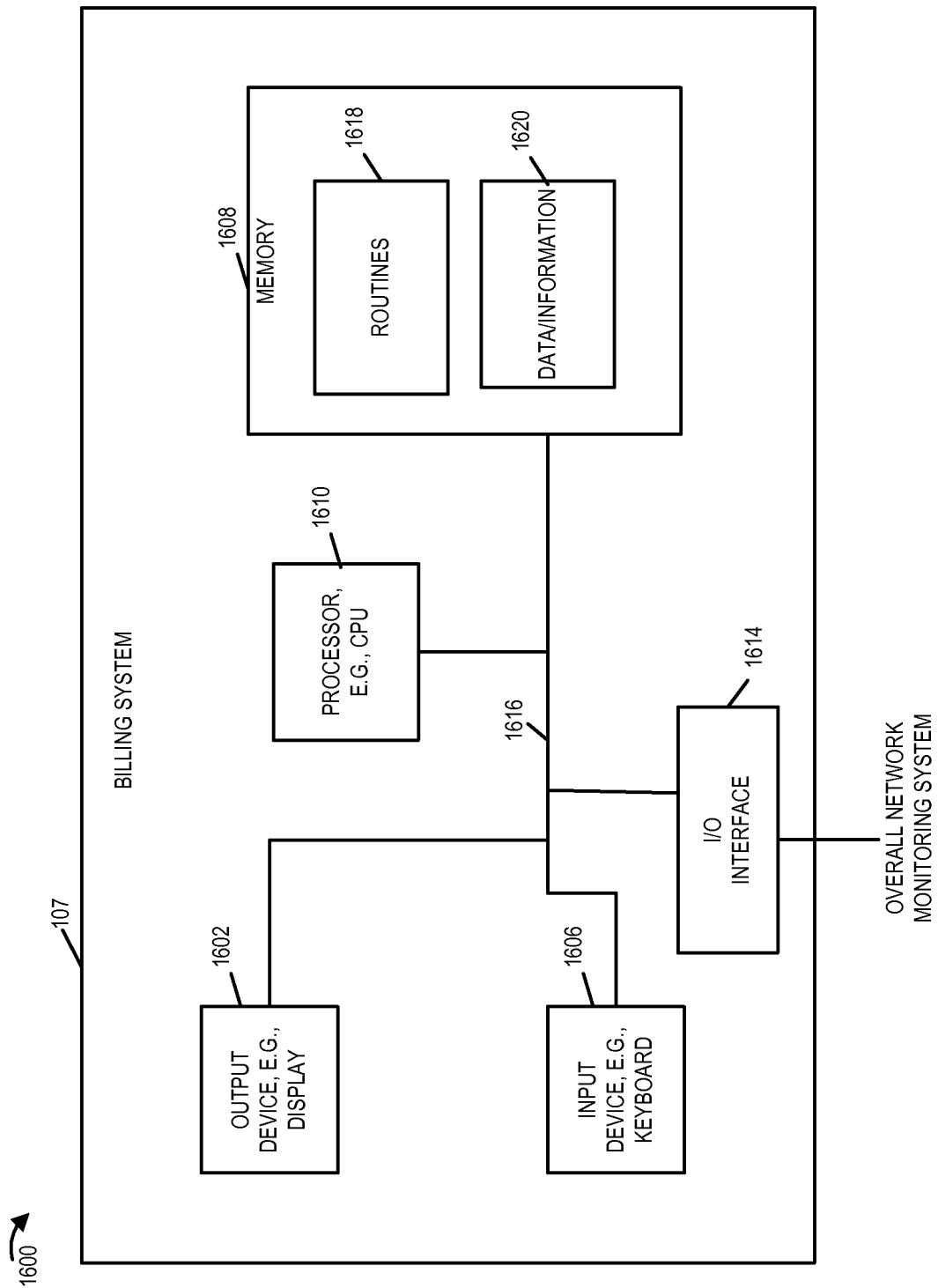
FIG. 16 is a drawing illustrating some of the details of exemplary billing system shown in the communications system of FIG. 1, in accordance with an exemplary embodiment of the present invention.

FIG. 16 is a drawing 1600 illustrating some of the details of exemplary billing system 107 of communications system 100 of FIG. 1 in accordance with an exemplary embodiment of the present invention. The billing system 107 includes an output device 1602, e.g., a display, an input device 1606, e.g., a keyboard, a processor 1610, e.g., a CPU, an I/O interface 1614, and a memory 1608. The various elements (1602, 1606, 1608, 1610 and 1614) are coupled together via a bus 1616 over which the various elements may exchange data and information. Memory 1608 includes routines 1618 and data/information 1620. The I/O interface 1614 couples the billing system to the overall network monitoring system 102 and the first network monitoring system 103, . . . , X network monitoring system. The I/O interface includes transmitters and receivers for transmitting and receiving information over communication link 109. The processor 1610 executes the routines 1618 and uses the data/information 1620 in memory 1608 to control the billing system and implement steps of a method, e.g., steps of the method of flowchart 300 of FIG. 3. In the exemplary embodiment, the following information is inputted into the billing system 107 via input device 1606 and stored in the data/information 1620 portion of memory 1608 for each customer: customer account identifier, e.g., account 136, customer premises devices corresponding to the account, e.g., customer premise device 1 112 type set top box, customer premise device 2, 114 type modem, the physical location of the account 136, region, e.g., region 1, distribution node to which customer premise devices 1 112 and 2 114 are connected, e.g., distribution node 1, customer address, information identifying the account as belonging to a VIP (very important person), customer billing invoice amounts, work orders corresponding to the account. The data associated with each customer may be, and in some embodiments is, stored in a customer data record in the data/information 1620 portion of memory 1608. The billing system also contains metrics on work orders for each customer and each node of the communication system 100. The billing system contains open work order information, pending trouble calls, e.g., the number of work orders that were opened, the date opened, by account, distribution node, region, and network monitoring system (e.g., hub). The number of cancelled work orders e.g., the number of works orders opened, the date opened and the date the work order was set to cancelled. The billing system information includes information about each open work order for example whether the open work order is related to a set top box, modem or digital phone. The billing system information further includes the total number of work orders open for each node of the communications system 100 by date, the average number of work orders open for each node by date, e.g., the current date, and the standard deviation of the open work orders for each node by date.

The billing system processor 1610 executing instructions from a open work orders today module in routine 1618 portion of memory 1008 generates and stores a value of the number of open work orders for each day include the current day for each node of the communications system 100, the average open work orders for each node of the communications system 100, the standard deviation for the number of open work orders for each node of the communications system 100, the average number of work orders for all nodes in each region, the standard deviation for the number of open work orders for all nodes in each region, the average number of open work orders for all nodes in the communications system 100, and the standard deviation of number of open work orders for all nodes in the communications system. The generated information is stored in data/information 1620 portion of memory 1608. The information associated with work orders is transmitted from the billing system to the 107 to the overall network monitoring system 102 where it is received by the I/O interface 1414 and stored in data/information 1420 of memory 1408 for use in generating an open work order score, a node condition score, and/or an overall node health score for each of the nodes of the communications system 100.

In some embodiments, the receiver of the I/O interface 1414 receives first work order information corresponding to a first node, e.g., the distribution node 1 104 of FIG. 1, relating to a first network portion, e.g., a portion of region 1, from the billing system 107. The processor 1410 generates from the first work order information a first work order score for the first node which is a part of a set of a first node condition score for the first node. This process is then repeated for each of the nodes of the communication system 100 so that work order scores are generated for each of the system's nodes, node 1104, . . . , node E 106, . . . , node F 108, . . . , node N 110.

Figure 12:
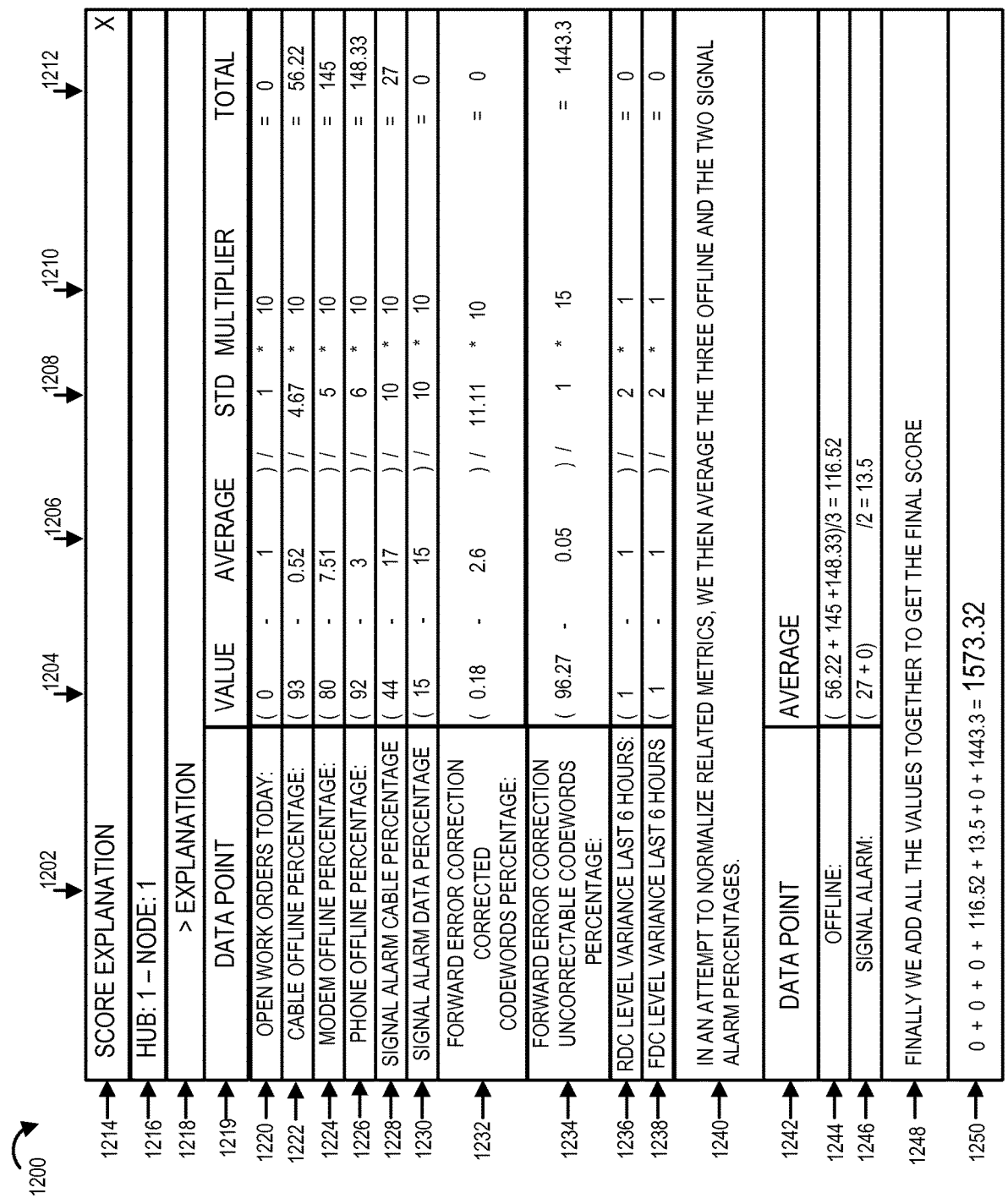
FIG. 12 illustrates an exemplary node score explanation display view that may be presented, e.g., on an output device of the overall network monitoring system.

FIG. 12 illustrates an exemplary node score explanation display view 1200 that may be, and in some embodiments is, presented on the output device 1402 of the overall network monitoring system 102 of FIG. 14 to a communications maintenance worker such as for example a technical support person, a repair technician, or a trouble reporting call center operator. In some embodiments, the display view and/or information associated therewith is transmitted to and displayed on a device such as for example a desk top computer, laptop, mobile phone and/or tablet communicating through I/O Interface 1414 of network monitoring system 102 over an external network such as the Internet.

Display view 1200 of FIG. 12 illustrates an exemplary score explanation that may be, and in some embodiments is, displayed on the display 1402 of the overall network monitoring system to a maintenance person, e.g., in response to a request for information explaining the node's network score. Some of the numbers in the example of FIG. 12 have been provided merely to show how the computation is performed and these numbers may not correspond to actual values that may be obtained by actual measurements. In some embodiments, the display view 1200 is generated by the overall network monitoring system 102. In some embodiments, the information shown in the display view 1200 is generated by the overall network monitoring system 102 with the display view 1200 being generated by an application and or hardware on a computing device coupled to the overall network monitoring system 102 such as a tablet, laptop, mobile phone, etc. being used by a maintenance person.

The display view 1200 contains a plurality of rows 1214, 1216, 1218, 1219, 1220, 1222, 1224, 1225, 1228, 1230, 1232, 1234, 1236, 1238, 1240, 1242, 1244, 1246, 1248, and 1250 containing information relating to Hub: 1–Node: 1 which for this example may be considered the distribution node 1 104.

Row 1214 includes the text SCORE EXPLANATION providing a title for the display view. The row 1214 also includes an X which is an actionable character than when a cursor is placed over it and clicked causes the display view 1200 to be closed.

Row 1216 includes information identifying the hub and node of the hub to which the node health score explanation corresponds. In this case it is Hub 1, Node: 1 which corresponds to the first network monitoring system 103 and the distribution node 1 104 of region 1.

Row 1218 includes the information>EXPLANATION indicating that the information below is an explanation of how the Hub 1, Node 1 node health score was generated. In some embodiments, the information in row 1218 of the display view 1200 is expanded to provide additional information. For example, in some embodiments the following information/text is included in row 1218: "The Node Health Score is calculated based on key metrics that have been identified as primary indications of Node health. In order to normalize and weight the metrics, the average value and standard deviation for each metric is generated. The value of the metric is then subtracted from the average value to obtain the amount above the average and this amount above the average is divided by the standard deviation therein generating the number of deviations above normal. This generated metric is then weighted based on the amount the metric is perceived to effect a Node's health. The weight is the multiplier used to obtain the weighted total score for the metric. If a Node's value for a metric is below average, zero is used for the total for that metric. This is done to prevent a positive performing metric from covering up a negative performing metric. For example, if a Node has a below average Offline Condition Score but a high Signal Alarm Condition Score, the overall health score for the node should still show a poor score. The higher the numerical overall health node score the poorer the performance of the node."

Row 1219 of FIG. 12 includes the titles identifying information contained in the columns 1202 Data Point, 1204 Value, 1206 Average, 1208 STD which stands for Standard Deviation, 1210 Multiplier, and 1212 Total for rows 1220, 1222, 1226, 1228, 1230, 1232, 1234, 1236, and 1238. The Data Point is used to refer to the metric being analyzed. The value is the value obtained for the metric for the hub 1 node 1, the average is the average for the metric for a node, the standard deviation is the standard deviation for the metric for a node, the multiplier is the weighting factor used to appropriately weight the metric based on its importance in determining the overall health score of the node, and the total is the weighted score for the metric.

Row 1220 includes information pertaining to the open work order information received from the billing system 107 and/or generated by the overall network monitoring system 102.

Row 1220 contains information about open work orders at node 1 and how the open work order condition score is generated and weighted. Row 1220 explains that the weighted open work condition score is generated using the equation (value of number of open work orders for today for Hub 1 Node 1–the average number of open work orders for this node)/(standard deviation of the number of open work orders for this node)*(weighting factor multiplier)=total wherein the total is set to zero when the total is a negative number. In this example, the equation contains (0 for value from row 1220 column 1204–1 for average row 1220 column 1206)/(1 standard deviation from row 1220 column 1208)*(1 weighting factor multiplier from row 1220 column 1210)=−1 so the open work orders metric is set to a total of zero.

Row 1220 column 1202 entry includes the information OPEN WORK ORDERS TODAY: indicating that the information included in row 1220 concerns information corresponding to the open work order today metric. Accordingly, information in row 1220 corresponds to the open work orders with today's date metric including the value row 1220, column 1204 entry of 0 indicating there are zero open work orders for today. The information contained in the entry corresponding to row 1220, column 1206 indicates that there is an average of 1 open work orders for a node. The information contained in the entry corresponding to row 1220, column 1208 of 1 indicates that the standard deviation for open work orders for a node is 1. The information contained in the entry corresponding to row 1220, column 1210 indicates that the weighting factor for the open work orders metric which is equal to a multiplier having a value of 10. The weighting factor is an estimation of the importance of the health of the node, e.g., as perceived by a customer. The information contained in the entry corresponding to row 1220, column 1212 indicates the total open work order health condition weighted score for Hub 1, Node 1 which in this example is 0.

Row 1222 shows the information received and/or generated by the overall network monitoring system 102 related to the calculation of a first offline device type score which is a cable, e.g., set top box devices, offline percentage. The cable offline percentage information from which the score is generated, e.g., value for hub 1 node 1, is received by the overall network monitoring system 102 from the first network monitoring system 103. Row 1222 shows the calculation used to obtain the weighted total score for the cable offline percentage condition as being (93 (value)–0.52 (average)/4.67 (standard deviation)*10 (weighting multiplier)= 56.22 (total score for offline cable devices).

Row 1224 shows the information received and/or generated by the overall network monitoring system 102 related to the calculation of a second offline device type score which is a modem offline percentage. The modem offline percentage information from which the score is generated, e.g., value for hub 1 node 1, is received by the overall network monitoring system 102 from the first network monitoring system 103. Row 1224 shows the calculation used to obtain the weighted total score for the modem offline percentage condition as being (80 (value)–7.51 (average)/5 (standard deviation)*10 (weighting multiplier)=145 (total score for offline modem devices).

Row 1226 shows the information received and/or generated by the overall network monitoring system 102 related to the calculation of a third offline device type score which is a phone, e.g., digital phone, offline percentage. The phone offline percentage information from which the score is generated, e.g., value for hub 1 node 1, is received by the overall network monitoring system 102 from the first network monitoring system 103. Row 1226 shows the calculation used to obtain the weighted total score for the phone offline percentage condition as being (92 (value)–3 (average)/6 (standard deviation)*10 (weighting multiplier)= 148.33 (total score for offline phone devices).

Row 1228 shows the information received and/or generated by the overall network monitoring system 102 related to the calculation of a first signal alarm condition score which is a signal alarm cable, e.g., set top boxes, percentage. The signal alarm cable percentage information from which the score is generated, e.g., value for hub 1 node 1, is received by the overall network monitoring system 102 from the first network monitoring system 103 where it is generated from information reported from the set-top box devices attached to node 1 of hub 1. Row 1228 shows the calculation used to obtain the weighted total score for the signal alarm cable percentage as being (44 (value)–17 (average)/10 (standard deviation)*10 (weighting multiplier)=27 (total score signal alarm cable percentage).

Row 1230 shows the information received and/or generated by the overall network monitoring system 102 related to the calculation of a second signal alarm condition score which is a signal alarm data percentage. The signal alarm data percentage information from which the score is generated, e.g., value for hub 1 node 1, is received by the overall network monitoring system 102 from the first network monitoring system 103 where it is generated from information reported from the modem devices attached to node 1 of hub 1. Row 1230 shows the calculation used to obtain the weighted total score for the signal alarm data percentage as being (15 (value)–15 (average)/10 (standard deviation)*10 (weighting multiplier)=0 (total score signal alarm data percentage).

Row 1232 shows the information received and/or generated by the overall network monitoring system 102 related to the calculation of a first communication error score which is a forward error correction corrected codewords percentage score. The forward error correction corrected codewords percentage information from which the score is generated, e.g., value for hub 1 node 1, is received by the overall network monitoring system 102 from the first network monitoring system 103 where it is generated from information reported from the customer premise devices coupled to node 1 of hub 1. Row 1232 shows the calculation used to obtain the weighted total score for the forward error correction corrected codewords percentage as being (0.18 (value)– 2.6 (average)/11.11 (standard deviation)*10 (weighting multiplier)=0 (total score forward error correction corrected codewords percentage) because the score is set to zero when the value minus the average is zero or less.

Row 1234 shows the information received and/or generated by the overall network monitoring system 102 related to the calculation of a second communication error score which is a forward error correction uncorrectable codewords percentage score. The forward error correction uncorrectable codewords percentage information from which the score is generated, e.g., value for hub 1 node 1, is received by the overall network monitoring system 102 from the first network monitoring system 103 where it is generated from information reported from the customer premise devices coupled to node 1 of hub 1. Row 1234 shows the calculation used to obtain the weighted total score for the forward error correction uncorrectable codewords percentage as being (96.27 (value)–0.05 (average)/1 (standard deviation)*15 (weighting multiplier)=1443.3 (total score forward error correction corrected codewords percentage). It should be appreciated that this metric contains a weight of 15 as it is uncorrectable codewords are considered as having a high impact on the node overall health.

Row 1236 shows the information received and/or generated by the overall network monitoring system 102 related to the calculation of a first signal level variance score which is a RDC level variance from the last six hours score. The RDC level variance information from which the score is generated, e.g., value for hub 1 node 1, is received by the overall network monitoring system 102 from the first network monitoring system 103 where it is generated from information reported from the customer premise devices coupled to node 1 of hub 1. Row 1236 shows the calculation used to obtain the weighted total score for the RDC level variance score as being (1 (value)−1 (average)/2 (standard deviation)*1 (weighting multiplier)=0 (total score RDC level variance).

Row 1238 shows the information received and/or generated by the overall network monitoring system 102 related to the calculation of a second signal level variance score which is a FDC level variance from the last six hours score. The FDC level variance information from which the score is generated, e.g., value for hub 1 node 1, is received by the overall network monitoring system 102 from the first network monitoring system 103 where it is generated from information reported from the customer premise devices coupled to node 1 of hub 1. Row 1238 shows the calculation used to obtain the weighted total score for the FDC level variance score as being (1 (value)−1 (average)/2 (standard deviation)*1 (weighting multiplier)=0 (total score FDC level variance).

Row 1240 includes the following text "In an attempt to normalize related metrics, we then average the three offline and the two signal alarm percentages" which provides an explanation of how a normalized offline device condition score and signal alarm condition score is generated for use in determining the overall health node score by averaging the three offline device type scores which are the weighted cable, e.g., set top boxes, offline percentage score the calculation of which is shown in row 1222, the weighted modem offline percentage score the calculation of which is shown in row 1224, and the weighted phone offline percentage score the calculation of which is shown in row 1226 to generate the normalized offline device condition score and by averaging the weighted signal alarm cable percentage condition score the calculation of which is shown in row 1228 and the weighted signal alarm data percentage condition score the calculation of which is shown in row 1230.

Row 1242 includes the text "Data Point" in row 1242 column 1202 and "Average" in associated with row 1242 and columns 1204, 1206, 1208, 1210, and 1212. The text "Data Point" and "Average" are titles for information included in rows 1244 and 1246 in the corresponding columns.

Row 1244 includes information explaining the calculation and information used to calculate the weighted offline device condition score for hub 1 node.

Row 1246 includes information explaining the calculation and information used to calculate the weighted signal alarm condition score for hub 1 node.

Row 1248 includes the text "Finally we add all the values together to get the final score" explaining that manner in which the overall health score for the node is determined.

Row 1250 includes information explaining the calculation and information used to calculate the overall health score for the hub 1 node 1. It shows the values 0 (weighted work order condition score from row 1220)+(weighted RDC signal level variance condition score from row 1236)+0 (weighted FDC signal level variance condition score 1238)+116.52 (weighted and normalized offline device condition score from row 1244)+13.5 (weighted and normalized signal alarm score from row 1246)+0 (weighted forward error correction corrected codewords condition score which is a first error score from row 1232)+1443.3 (weighted forward error correction uncorrectable codewords condition score which is a second error score)=1573.32 (overall health score of the hub 1 node 1). The higher the score the worse the performance of the node.

By providing a detailed explanation of the overall health score to maintenance personnel it allows the maintenance personnel to quickly determine the metrics contributing the most to the overall health score and zero and therein determine where problems or potential problems are most likely to be occurring in the node 1 distribution network. In this case the forward error correction uncorrectable codewords score is the main metric contributing to the overall health score followed by the offline device condition score. Within the offline device score the information display in view 1200 shows that the modem offline percentage score and phone offline percentage scores being the main contributors to the offline device score. Based on the breakdown of metrics provided in the view 1200 it can quickly be determined that the signal variance of the RDC and FDC power levels, the signal alarm data percentage and forward error correction corrected codeword percentage are not problems to be focused on as their respective scores were zero indicating that they did not contribute the overall health score of the node.

Figure 17:
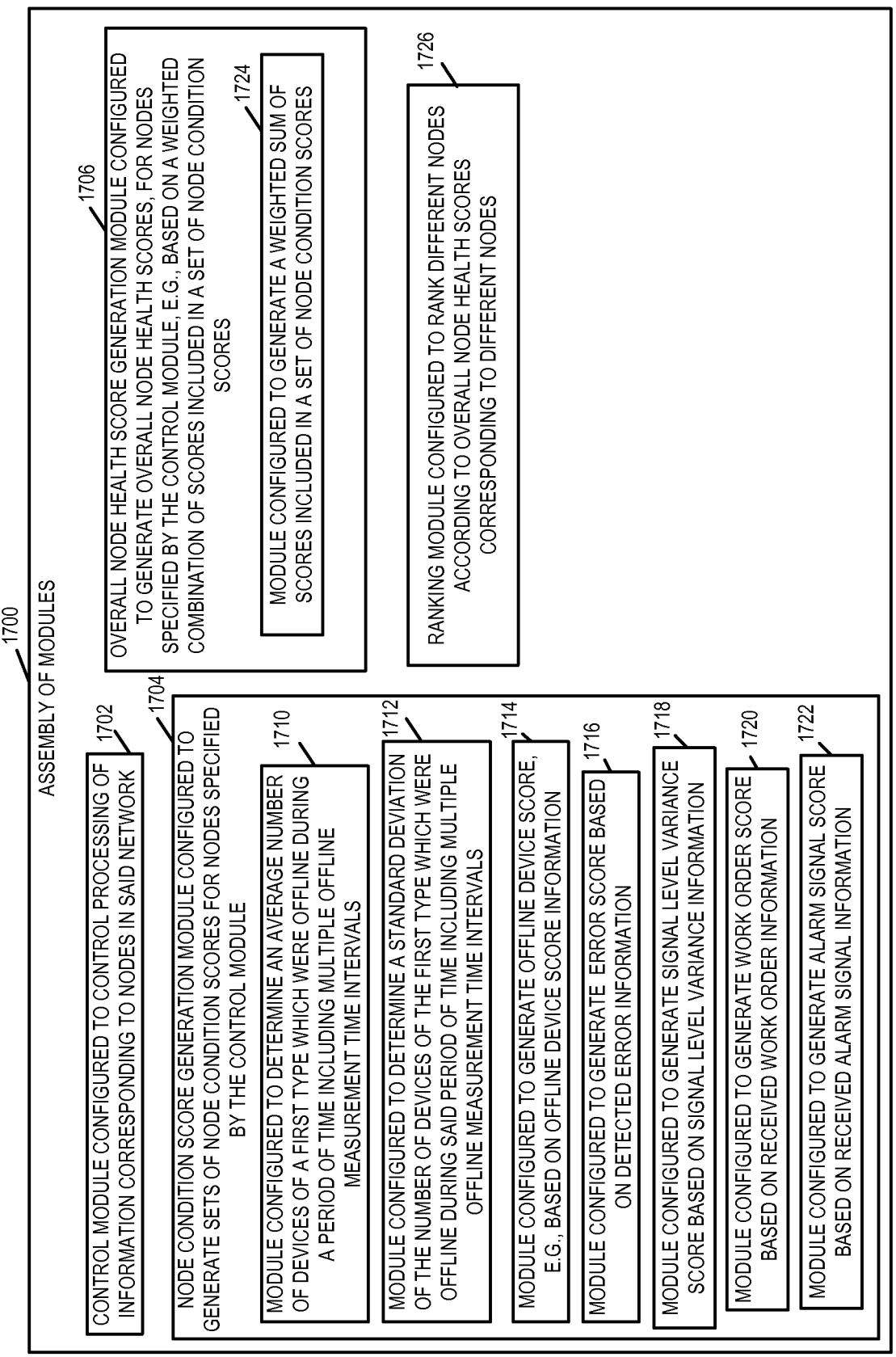
FIG. 17 is an assembly of modules which can be used in the exemplary overall network monitoring system illustrated in FIG. 14.

FIG. 17 is an assembly of modules 1700 which can, and in some embodiments is, used in the exemplary overall network monitoring system 102 illustrated in FIG. 14. Assembly of modules 1700 can be implemented in hardware within the processor 1410 of the overall network monitoring system 102, e.g., as individual circuits. The modules in the assembly 1700 can, and in some embodiments are, implemented fully in hardware within the processor 1410, e.g., as individual circuits. In other embodiments some of the modules are implemented, e.g., as circuits, within the processor 1410 with other modules being implemented, e.g., as circuits, external to and coupled to the processor. As should be appreciated the level of integration of modules on the processor and/or with some modules being external to the processor may be one of design choice.

Alternatively, rather than being implemented as circuits, all or some of the modules may be implemented in software and stored in the memory 1408 of the overall network monitoring system 102 with the modules controlling operation of the overall network monitoring system 102 to implement the functions corresponding to the modules when the modules are executed by a processor, e.g., processor 1410. In some such embodiments, the assembly of modules 1700 is included in routines 1418 of memory 1408 of the overall network monitoring system 102. In still other embodiments, various modules are implemented as a combination of hardware and software, e.g., with another circuit external to the processor providing input to the processor 1410 which then under software control operates to perform a portion of a module's function. While shown in the FIG. 14 embodiment as a single processor, e.g., computer, it should be appreciated that the processor 1410 may be implemented as one or more processors, e.g., computers.

When implemented in software the modules include code, which when executed by the processor 1410, configure the processor 1410 to implement the function corresponding to the module. In embodiments where the assembly of modules 1700 is stored in the memory 1408, the memory 1408 is a computer program product comprising a computer readable medium comprising code, e.g., individual code for each module, for causing at least one computer, e.g., processor 1410, to implement the functions to which the modules correspond.

Completely hardware based or completely software based modules may be used. However, it should be appreciated that any combination of software and hardware, e.g., circuit implemented modules may be used to implement the functions. As should be appreciated, the modules illustrated in FIG. 17 control and/or configure the network monitoring system 102 or elements therein such as the processor 1410, to perform the functions of the corresponding steps illustrated in the method flowchart 200 of FIG. 2. Thus the assembly of modules 1700 includes various modules that perform functions of the corresponding steps of the method shown in FIG. 2.

As illustrated in FIG. 17, the assembly of modules 1700 includes a module 1702 configured to control processing of information corresponding to nodes in a network, e.g., network 100, a node condition score generation module 1704, an overall node health score generation module 1706, and a ranking module 1726.

In various embodiments the information corresponding to various nodes is received, e.g., via the receiver 1424 included in the I/O interface 1414. In some embodiments the receiver 1424 receives receive information corresponding to nodes in the network 100, the nodes including at least a first node, e.g., node 104, the information corresponding to nodes in the network including at least first information relating to a first network portion, e.g., region 1 152, which includes customer premise devices which communicate via the first node with other devices, the first information including at least first offline device information, first communication error information, and first signal level variance information. The control module 1702 is configured to process the received information and provide the processed information to one or more other modules, e.g., modules 1704 and 1706, in accordance with the features of the invention. The control module 1702 in some embodiments specifies a node for which node condition scores and/or overall node health score should be generated by the modules 1704 and 1706. For example, when the control module 1702 specifies that sets of node condition scores for the first node are to be generated and provides the information corresponding to the first node to the module 1704, the module 1704 generates a first set of node condition scores for the first node.

The node condition score generation module 1704 is configured to generate sets of node condition scores for nodes specified by said control module 1702, e.g., for node 1 104 to node N 110. The node condition score generation module 1704 generates various sets of node condition scores including at least a first set of node condition scores corresponding to the first node. In various embodiments the first set of first node condition scores generated by the node condition score generation module 1704 includes a first offline device score based on the first offline device information, a first error score based on the first detected error information, and a first signal level variance score based on the first signal level variance information. In various embodiments the node condition score generation module 1704 includes various sub-modules such as modules 1710 and 1712 which are configured to generate information useful in generating different node condition scores and modules such as modules 1714, 1716, 1718, 1720, and 1722 which are configured to generate different node condition scores included in the set of node condition scores.

The module 1710 is configured to determine an average number of devices of a first type which were offline during a period of time including multiple offline measurement time intervals. The module 1712 is a standard deviation determination module configured to determine a standard deviation of the number of devices of the first type which were offline during said period of time including said multiple offline measurement time intervals. The offline device score generation module 1714 is configured to generate offline device score based on the offline device score information. Thus the offline device score generation module 1714 is configured to generate the first offline device score based on the first offline device information. In some embodiments the offline device information includes a measured number of offline devices of the first type, which is a number of devices of the first type which were offline during an offline measurement period of interest for which the first offline device score is generated. Thus the offline device score generation module 1714 in some embodiments is configured to generate the first offline device score based on the measured number of offline devices of a first type. In some embodiments the offline device score generation module 1714 is further configured to set the first offline device score to zero, as part of generating the first offline device score, when said measured number of devices of the first type which were offline during the offline measurement period of interest is less than said average number of devices of the first type which were offline.

In some embodiments the offline device score generation module 1714 is further configured, as part of generating the first offline device score, to set the first offline device score to the number of devices of the first type which were offline during the offline measurement period of interest minus said average number of offline devices of the first type divided by the standard deviation of the number of devices of the first type which were offline during said period of time including said multiple offline measurement time intervals, when the number of devices of the first type which were offline during said period of time including the multiple offline measurement time intervals is equal to or greater than said average number of devices of the first type which were off line.

The module 1716 is configured to generate error score based on detected error information, the module 1718 is configured to generate signal level variance score based on signal level variance information, the module 1720 is configured to generate work order score based on work order information, and the module 1722 is configured to generate an alarm score based on the received alarm signal information. Thus it should be appreciated that the node condition score generation module 1704 including various above discussed sub-modules generates various sets of node condition scores for different nodes.

The overall node health score generation module 1706 is configured to generate overall node health scores, for nodes specified by the control module 1702, based on a weighted combination of scores included in a set of node condition scores, e.g., corresponding to the given nodes. In various embodiments the overall node health score generation module 1706 is configured to generate overall node health scores including a first node health score corresponding to the first node based on a weighted combination of the scores included in the first set of node condition scores for the first node 104. Similarly for any given node specified by the control module 1702, e.g., node N 110, the overall node health score generation module 1706 generates an overall $N^{th}$ node health score corresponding to the $N^{th}$ node based on a weighted combination of the scores included in a set of $N^{th}$ node condition scores. In various embodiments the overall node health score generation module 1706 includes a weighted sum generation module 1724 configured to generate a weighted sum of scores included in a given set of node condition scores. In some embodiments the error score is an uncorrectable detected error score. In some embodiments the weighted sum generation module 1724 is configured to weight an error score more heavily than an offline device score, as part of being configured to generate said weighted sum of scores. In some embodiments the weighted sum generation module 1724 is further configured to weight the signal variance score with a weight that has the lowest weight used to weight a score in a set of node condition scores, as part of being configured to generate the weighted sum. In some embodiments the weighted sum generation module 1724 is further configured to weight the work order score and the alarm signal score evenly, as part of being configured to generate the weighted sum. In various embodiments the overall node health score corresponding to a node is an average of weighted scores corresponding to that node.

The ranking module 1726 included in the assembly of modules 1700 is configured to rank various nodes, e.g., first and second nodes, according to the node health scores corresponding to these nodes.

In some embodiments, one or more modules shown in FIG. 17 which are included within another module may be implemented as an independent module or modules.

Figure 18:
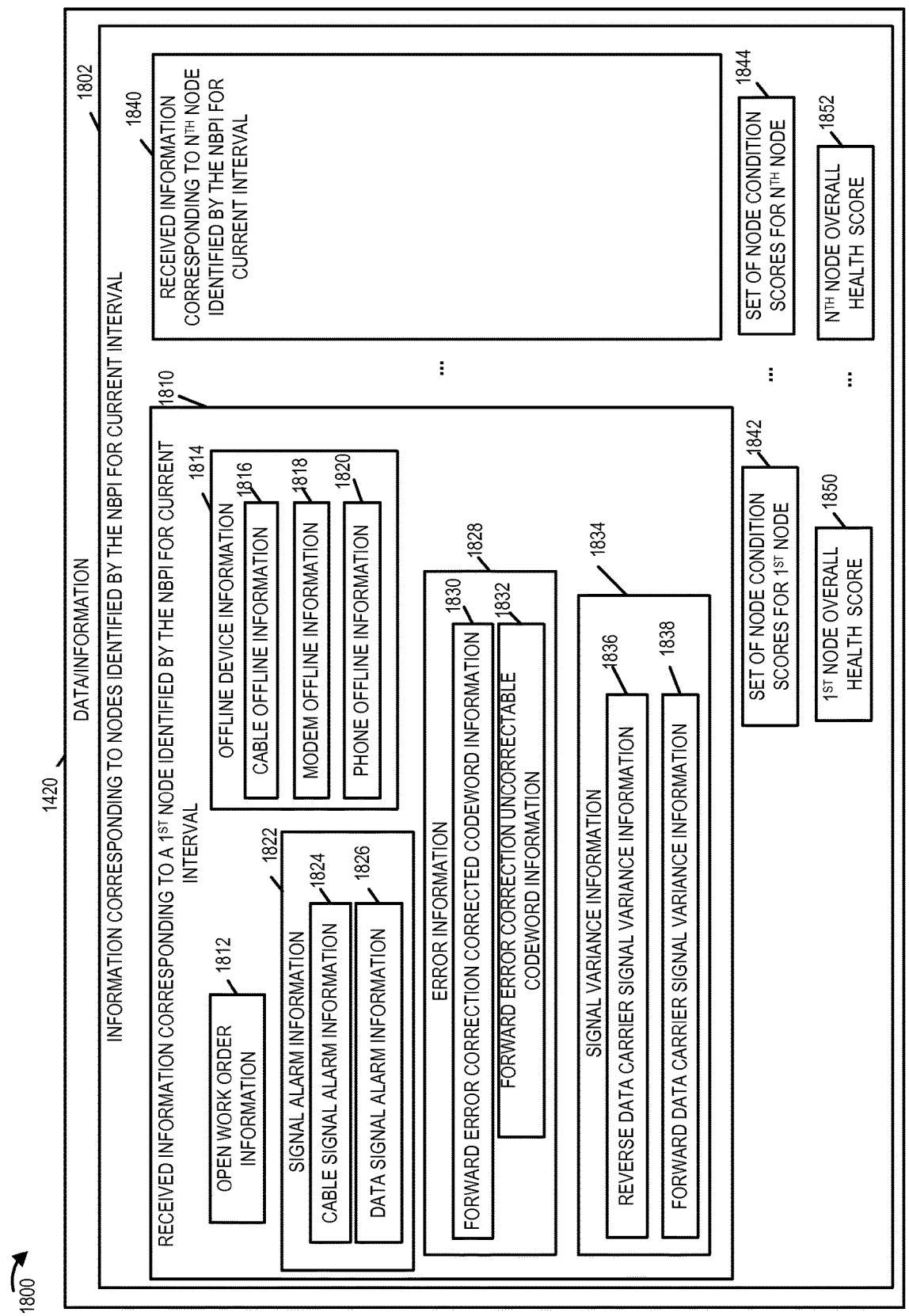
FIG. 18 is a detailed illustration of the exemplary data/information stored in the exemplary overall network monitoring system illustrated in FIG. 14.

FIG. 18 is a detailed illustration 1800 of the exemplary data/information 1420 stored in memory 1408 of the exemplary overall network monitoring system 102 illustrated in FIG. 14. The data/information 1420 includes information 1802 corresponding to nodes identified by a Node Being Processed Identifier (NBPI) for a current interval which includes a plurality of sets of received information corresponding to different nodes including received information 1810 corresponding to a $1^{st}$ node identified by the NBPI for a current interval through received information 1840 corresponding to a $N^{th}$ node identified by the NBPI for a current interval. The information 1802 further includes a plurality of sets of node condition scores corresponding to different nodes including set of node condition scores for the $1^{st}$ node 1842 through set of node condition scores for the $N^{th}$ node 1844. The information 1802 further includes a plurality of overall node health scores corresponding to different nodes including $1^{st}$ node overall health score 1850 through $N^{th}$ node overall health score 1852.

The received information corresponding to a $1^{st}$ node identified by the NBPI for a current interval 1810 includes open work order information 1812, offline device information 1814, signal alarm information 1822, error information 1828 and signal variance information 1834. The open work order information 1812 in some embodiments indicates a number of trouble work orders that remain open at the end of a work order monitoring interval. The offline device information 1814 includes cable offline information 1816 indicating a number of cable set top boxes that are offline, modem offline information 1818 indicating a number of data modems offline and phone offline information 1820 indicating a number of IP phones that are offline.

The signal alarm information 1822 includes information regarding the number of signal alarms, e.g., forward data channel signal alarms and reverse data channel signal alarms for a node. The signal alarm information 1822 includes cable signal alarm information 1824 and data signal alarm information 1826.

The error information 1828 includes information regarding communications errors and is used for determining overall node health. The error information 1828 includes forward error correction corrected codeword information 1830 and forward error correction uncorrectable codeword information 1832 indicating e.g., number of detected uncorrectable errors.

The signal variance information 1834 includes information regarding variations in signal power levels. The signal variance information 1834 includes reverse data carrier signal variance information 1836 indicating reverse data channel signal power level variance and forward data carrier signal variance information 1838 indicating forward data channel signal power level variance.

From the various different types of information relating to overall node health that are received for a node, a corresponding set of node condition scores is generated such as the set of node condition scores for the $1^{st}$ node 1842 and the set of node condition scores for the $N^{th}$ node 1844. The set of node condition scores may, and in some embodiments does, include a score for each of the different types of information relating to overall node health that is received.

The $1^{st}$ node overall health score 1850 includes information regarding the overall node health score for the $1^{st}$ node, e.g., generated based on the set of node condition scores for the $1^{st}$ node 1842, and the $N^{th}$ node overall health score 1852 includes information regarding the overall node health score for the $N^{th}$ node, e.g., generated based on the set of node condition scores for the $N^{th}$ node 1844.

Having described various elements of the communications system 100 various methods, routines and subroutines implemented by the system 100 will now be described.

Figure 2A:
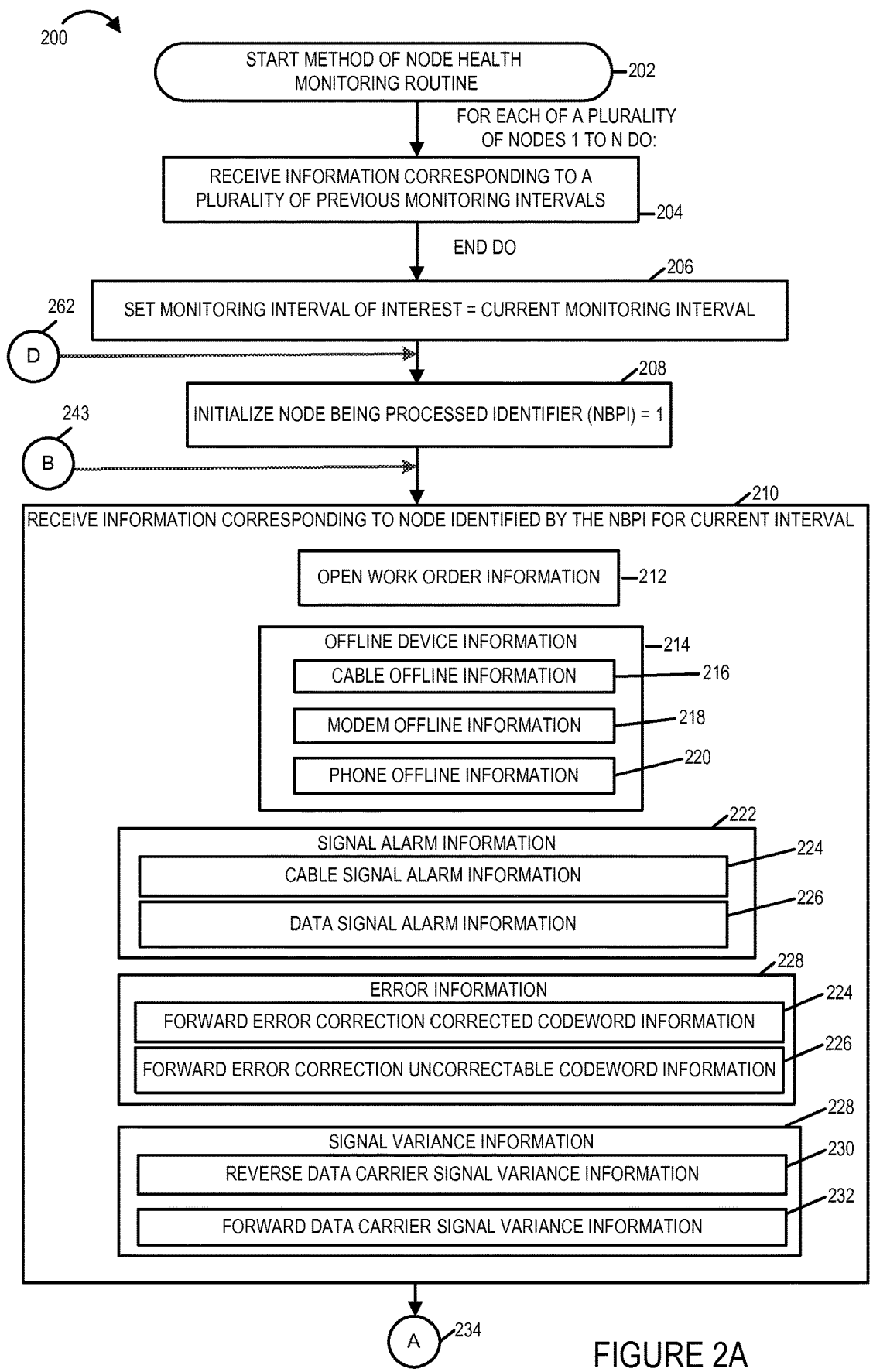
FIG. 2, which comprises the combination of FIGS. 2A, 2B, and 2C, illustrates the steps of an exemplary node health monitoring routine used to generate overall node health scores for network nodes in a communication system, in accordance with some embodiments.
Figure 2B:
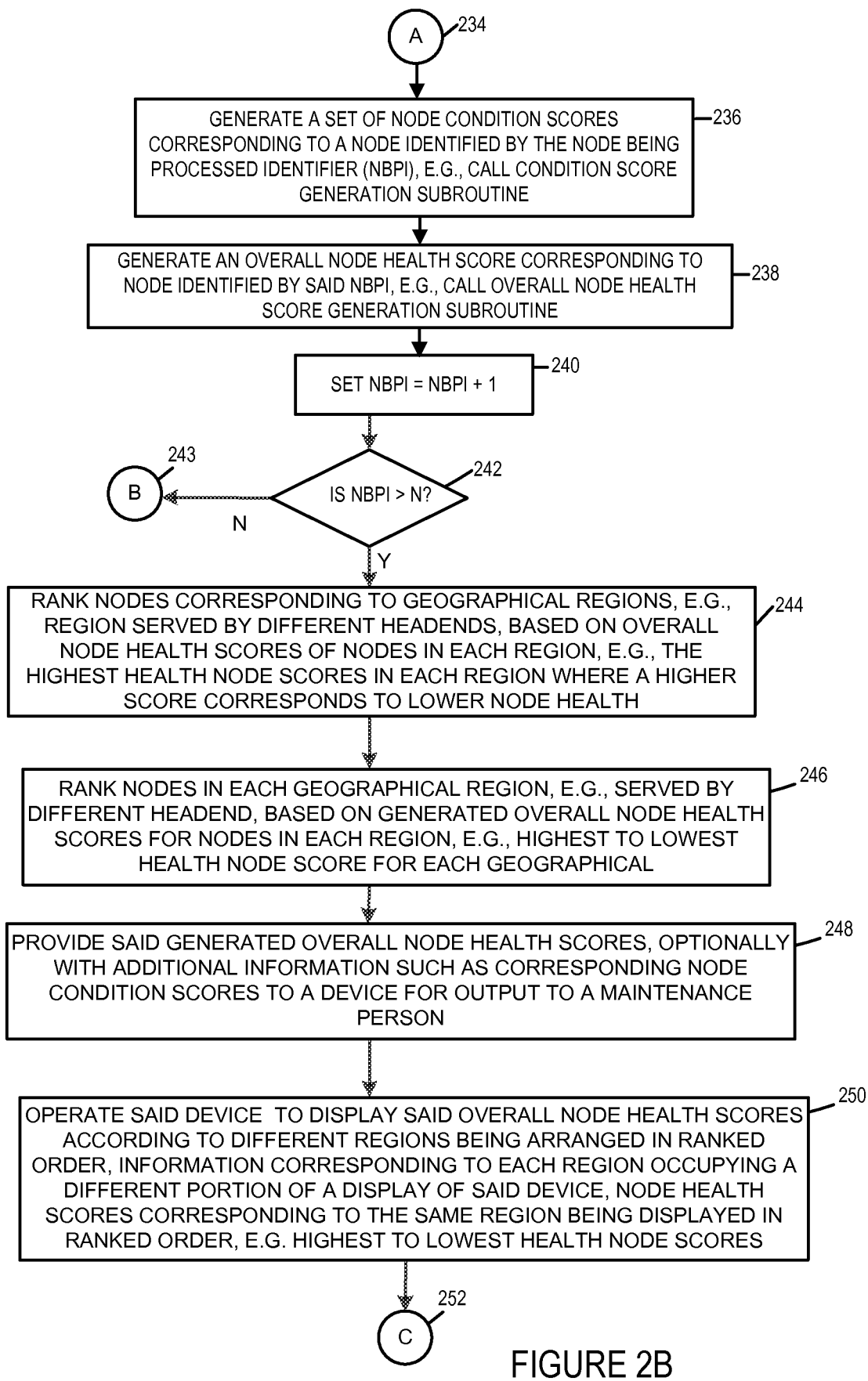
Figures 2, 2C:
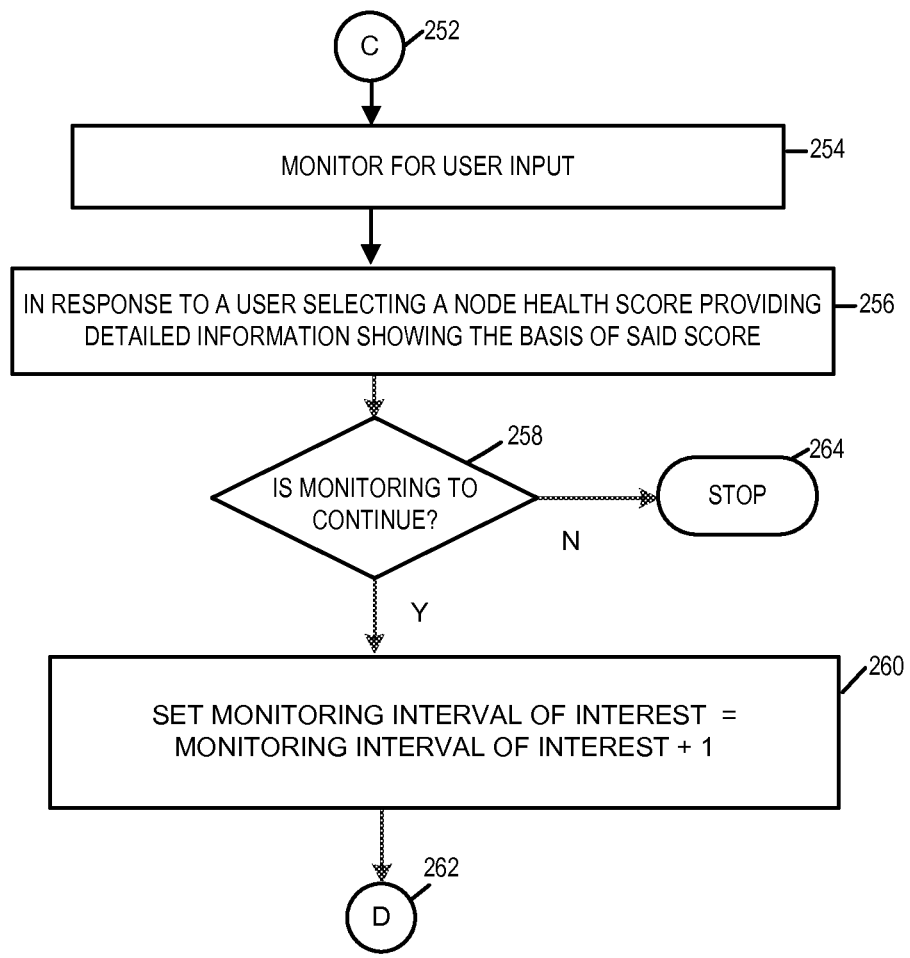

FIG. 2, which comprises the combination of FIGS. 2A, 2B, and 2C, illustrates the steps of an exemplary node health monitoring routine 200 which is used to generate overall node health scores for network nodes, e.g., distribution nodes, 104, 106, 108, 110 in a communication system such as the type shown in FIG. 1. The steps of the method 200 may, an in some embodiments are, implemented by the overall network monitoring system 102.

The method 200 starts in step 202, e.g., with the overall network monitoring system initializing and beginning to perform its functions. Operation proceeds from step 202 to step 204 which is performed for each of the plurality of nodes 104, 106, 108, 110 in the system 100 being monitored. In step 204, the overall network monitoring system 102 receives information corresponding to a plurality of previous monitoring intervals. The information may include information relating to the individual node for which step 204 is being performed, e.g., open work order information, offline device information, signal alarm information, error information, and/or signal variance information for one or more previous monitoring intervals. The information may also include averages and/or standard deviations for each of the types of information which is received. Alternatively, the received information may include sufficient information to generate an average and a standard deviation for each metric for which information is received. In some embodiments the average and standard deviation for a metric is based on the information corresponding to an individual node, e.g., information for multiple monitoring intervals which is averaged and processed to generate an average and standard deviation for the metric for the individual node. In other embodiments, an average and standard deviation is generated from information corresponding to multiple nodes with the information also being for multiple monitoring intervals. Open work order information may be received as part of step 204 from the billing system while other information relating to errors, signal alarms, offline devices, etc. may and in some embodiments is, obtained from regional and/or local network monitoring systems 103, 105.

Thus, by the time the do loop corresponding to step 204 is exited after being performed for the last of the N nodes, sufficient information will have been received, e.g., statistical information about previous monitoring intervals, that the overall network monitoring system will have sufficient data to compute averages and/or standard deviation values for each of a plurality of different metrics used to generate an overall node health score for each of the nodes 104, 106, 108, 110 in each of the regions 152, 154 being monitored.

After the information is received in step 204 for each of the N distribution nodes in the system 100 which are to be monitored by the overall network monitoring system 102, operation proceeds to step 206. In step 206 a monitoring interval indicator value, monitoring interval of interest, is set equal to the value of the current monitoring interval. As will be discussed below, as the processing associated with a current monitoring interval is completed, the current monitoring interval counter will be updated. Thus, over time, the monitoring interval of interest will be updated and a score will be generated as new monitoring interval results are received.

Operation proceeds from step 206 to step 208 in which a node loop counter variable, a Node Being Processed Identifier (NBPI) value, is initialized by being set equal to one. The NBPI value will be updated as each time an overall health score for a node is generated until overall health scores have been generated for the full set of N nodes being monitored. Operation proceeds from step 208 to step 210 which marks the start of the processing related to generating an overall health score for the node identified by the NBPI value, e.g., node 1 104 the first time step 210 is performed.

In step 210, various information corresponding to the node identified by the NBPI is received for the current monitoring interval, i.e., the monitoring interval of interest. Different portions of the information which is received maybe, and in some embodiments is, received from different devices in the network, e.g., regional monitoring systems 103 or 105 and billing system 107.

The information received in step 210 is information which is useful for scoring the health of a node, e.g., in generating an overall node health score that takes into consideration the current condition of the communications channels between the distribution node for which the score is being generated and the customer premises being served by the distribution node. The overall node health score being generated takes into consideration a wide range of information some of which is indicative of actual faults but other information which may or may not indicate a fault and/or information which may indicate a potential failure of a network component in the near future.

Among the information received in step 210 is open work order information 212, e.g., trouble work order information indicating the number of open trouble work orders at the end of a work ordering monitoring interval. While it is expected that some work orders corresponding to a node will be open at the end of each or most monitoring intervals, a larger than normal number of open work orders may be indicative of poor node health.

Offline device information 214 indicating the number of offline customer premise devices coupled to the distribution node us also received in step 210. Offline device information 214 may include information on a per device type basis. In some embodiments the offline device information includes cable offline information 216, modem offline information 218 and phone offline information 220. In some embodiments the offline device counts 216, 218, 220 are mutually with each device being counted only once even if it includes, for example, a data modem and an IP phone interface. The offline counts may, and in some embodiments are, specified in percentages with the indicated number of offline devices indicating the offline number of device per 100 devices of a given type serviced by, e.g., attached to, the distribution node and which rely on the node to receive service. While offline device information may provide some indication of node health, e.g., if an usually large percentage of devices are offline which may suggest that the offline status is caused by a hardware failure, a number of devices may simply be offline because they are powered off as part of normal operation of a customer premise device. Accordingly, device offline information may be less indicative of overall node health than, for example, actual detected communication errors.

In addition to offline device information, the information received in step 210, includes, in some embodiments, signal alarm information 222. The signal alarm information 222 may include signal alarm values on a per device type basis, e.g., cable signal alarm information 224 and data signal alarm information 220. As with the other information in received in step 210, the alarm information may be normalized, e.g., indicate a number of alarms per 100 devices or per some other number of devices, e.g., per 1000 devices. The normalization of the information, e.g., counts or other numerical values included in the received information, allows information from different nodes which service different numbers of devices to be compared and scored in a manner that allows for meaningful ranking of nodes based on generated overall health scores.

In addition to signal alarm information error information 228 is received. The error information is particularly meaningful since it reflects detection of an actual communications error, e.g., a codeword or packet error which occurred in the process of communicating via the distribution node being scored. The error information 228 includes, in at least some embodiments, corrected codeword information 224 and uncorrectable codeword information 226. Corrected codeword information 224 is a metric used to indicate a measure of the number of correctable codewords which were detected in the current monitoring interval while uncorrectable codeword information 226 is a measure of codeword errors which where detected in the current monitoring interval. The error measures may be normalized based on a number of codewords communicated, e.g., the information may indicate the percentage of codewords which were communicated where in such a case the normalization factor is 100 codewords.

As should be appreciated uncorrectable errors are likely to have a much more significant impact on a customer's perceived quality of service than correctable errors. Accordingly, as will be discussed further below, when generating an overall node health score uncorrectable errors are sometimes weighted more heavily than correctable errors.

In addition to error information and the various other types of information discussed above, in at least some embodiments signal variance information 228 is received in step 210. The signal variance information may, and sometimes does include, reverse data carrier (RDC) signal variance information 230 and forward data channel (FDC) signal variance information 232. Wide variations, e.g., variance, in the power levels of signals used on to communicate data on the forward and reverse data carriers can indicate a potential network problem in a transmitter, amplifier and/or receive corresponding to the carrier with wide power level swings. Accordingly, signal variance information is useful in detecting possible network problems but does not necessarily reflect a communications failure or actual network fault. Thus, signal variance information is useful in generating an overall network node health score but less useful than some of the other types of information received in step 210. While the duration of the monitoring interval for each of the different types of information received in step 210 may be the same, in some embodiments some data is monitored more frequency than other information. For example the RDC signal variance may be monitored and indicated for a 6 hour time interval while error information may be monitored at 15 minute intervals.

In one embodiment node health scores are generated in one embodiment using the most recently available information. Thus, the current interval for which an overall node health score is generated may have a shorter duration than the duration of the monitoring interval for the type of data having the longest monitoring interval, e.g., the 6 hour monitoring interval. Normally, the rate at which node health scores are generated will be equal to or lower than the fastest rate at which any of the information received in step 210 may change, e.g., 15 minutes in some embodiments.

With the information which will be used to generate a current overall node health score having been received, operation proceeds from step 210 to step 236 via connecting node A 234.

In step 236 a set of node condition scores corresponding to the node identified by the current value of the NBPI (node being processed identifier) is generated. Step 236 may, and in some embodiments does, involve a call to a condition score generation subroutine, e.g., routine 300 shown in FIG. 3 which will be described below.

The set of node condition scores generated in step 236 may, and in some embodiments does, include an open work order score; one or more offline device scores, e.g., with individual offline device scores corresponding to different types of devices such as cable devices, modems or IP phones; one or more alarm scores, e.g., with different alarms; a corrected error score; an uncorrected error score, a reverse data carrier (RDC) signal variance score; and a forward data carrier (FDC) signal variance score with each of the scores corresponding to the node identified by the current value of the NBPI and being for the monitoring interval of interest, e.g., the current interval for which the overall node health score is being generated. The various scores included in the set of node condition scores is exemplary and the set may include more scores or a subset of the scored mentioned above.

Figure 11:
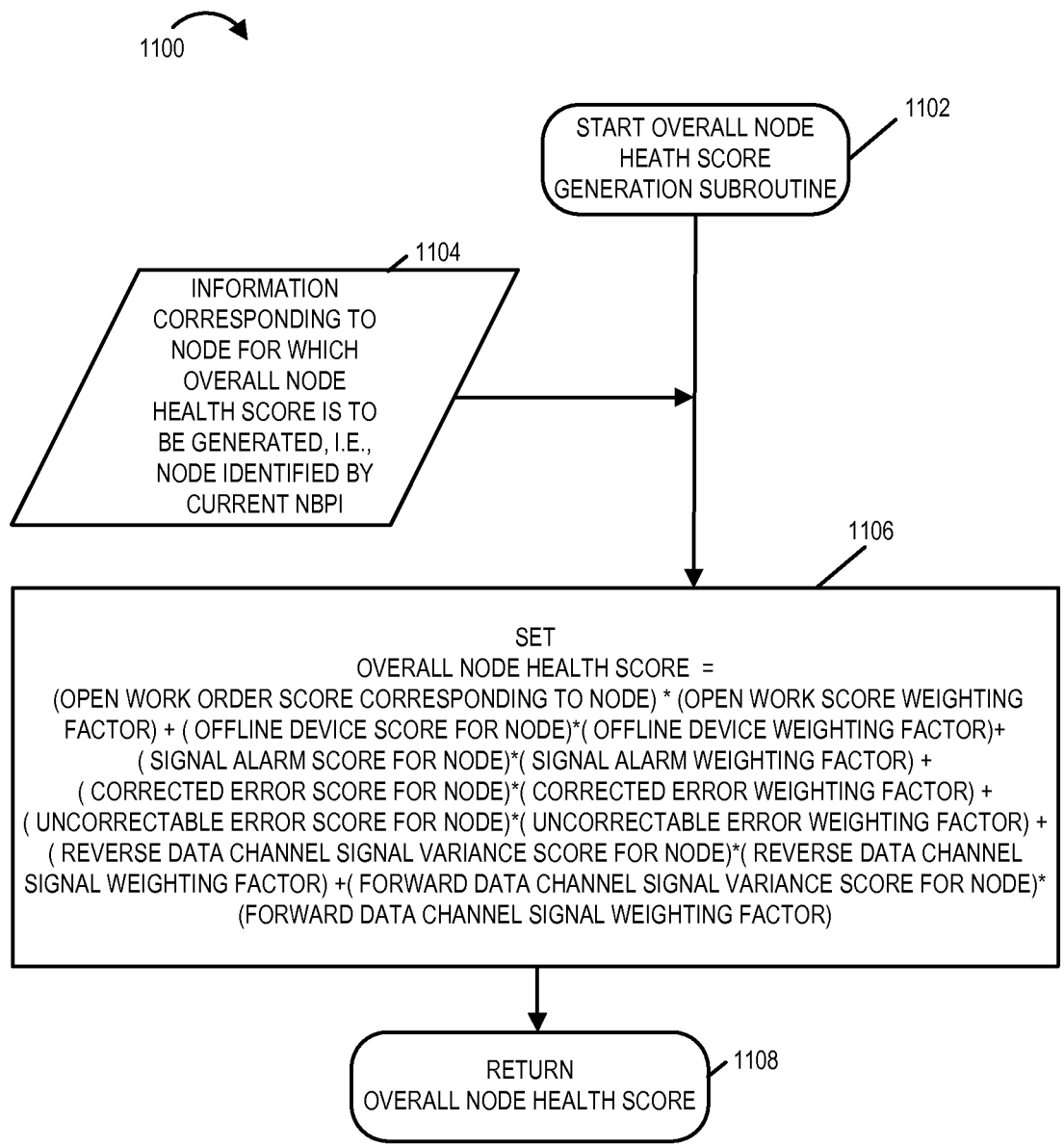
FIG. 11 is a flowchart illustrating the steps performed when a overall node health score generation subroutine is executed, in accordance with some embodiments of the invention.

The set of node condition scores generated in step 136 is supplied as input to the overall node health score generation step 238 wherein an overall node health score corresponding to the node identified by the NBPI is generated, e.g., by a call to an overall node health score generation subroutine, e.g., a routine such as the routine 1100 shown in FIG. 11 which returns a single score indicate of the overall health of a node, e.g., the one of the distribution nodes 104, 106, 108 or 110 corresponding to the current value of the NBPI. In some embodiments the higher the overall node health score the worse off the node is in terms of overall health. Thus, in some embodiments a low overall node health score indicates a node which is likely to have few if any problems while a high node health score indicates a potential problem node.

At the end of step 238 an overall node health value for the current monitoring interval of interest has been generated and is available for use in ranking the node identified by the NBPI relative to other nodes. However, if overalls scores have not been generated for each of the N nodes, scores have to be generated for the other nodes before the full set of nodes can be ranked based on the overall node health scores.

In step 240 the NBPI is incremented. Then in step 242 the NBPI is compared to N to determine if the NBPI is greater than N indicating that data for the N nodes have been processed and that an overall node score has been generated for each of the individual N nodes. If in step 242 NPBI is determined to be less than or equal to N, operation proceeds via connecting node 243 to step 210 where information corresponding to the node identified by the NBPI value is received to facilitate generation of an overall node health score for the identified node.

However, if NBPI is greater than N, there are no remaining node scores to be generated for the current monitoring interval and operation proceeds to ranking step 244.

In step 244 the nodes are corresponding to geographical regions, e.g., individual geographical regions served by different headends, are ranked based on overall node health scores of nodes in each region. In some embodiments the highest node score in each region is used to determine region ranking. In one such embodiment the higher the score the lower the ranking. Once the regions have been ranked, nodes within each geographic region are ranked in step 246 based on the individual node health scores within a region. The ranking within regions may be from highest node health score to lowest node health score thereby putting the worst nodes at the top of the list of nodes in each region. While the ranking within the regions results in the nodes within a region being ranked from worst to best, the same type of ranking is applied to the regions causing the region with the worst node to be placed at the top of the region rankings.

While ranking of nodes within regions is possible as discussed above, in some embodiments nodes are ranked without regard to regions. In at least one such embodiment nodes are simply listed, i.e., presented in ranked order, from the highest scoring node to the lowest scoring node resulting in the nodes being listed from worst at the top of the list to best at the bottom of the list. A single ranking step is performed in such embodiments with the full set of nodes being treated as a single graphical region.

The overall node health scores are provided in step 248 to a device such as a display of the overall network monitoring system 102 or to a maintenance persons work station or portable user device for output to a maintenance person. In some embodiments the overall node health scores are output in ranked order along with addition information such as the corresponding node condition scores and/or information identifying the geographic region to which the scored node corresponds and/optionally, the underlying data for the nodes such as the number of open work orders, signal alarms, etc. When such information is provided it can be accessed by the maintenance person facilitating identification of the source and/or reason for a nodes poor health score as may be indicated by a high overall node health score having been generated for a particular node.

Operation proceeds from step 248 to step 250. In step 250, the device which is provided with the overall node health scores, e.g., a cell phone, laptop or workstation used by a maintenance person, is operated to display the overall node heal scores, e.g., on a display included in or attached to the device used by the maintenance person. In one embodiment in step 250 the overall node health scores are arranged in ranked order according to geographic regions, e.g. with the region having the node with the highest overall node heath score being presented first or at the top of the screen and the information corresponding to other regions being presented later or at the bottom of the screen. Within the set of information corresponding to each of the ranked regions nodes are displayed in ranked order with node in the region having the worst node health as indicated by the highest overall node health score in some embodiments, being presented at the top of the list of nodes for the region. In this way, the maintenance person's attention is focused on the nodes with the worst health conditions since they will be presented at the top of the list of nodes in each region.

In at least one embodiment where regions are ranked based on overall node health scores, the overall node health scores corresponding to different regions are presented in different non-overlapping portions of a display device. For example the overall node health scores corresponding to region 1 are shown in a separate contiguous rectangular area of the display screen which is different from a second portion of the display device used to display the overall node health scores corresponding to region 2 which includes overall node health scores for the nodes in region 2.

While overall node health scores for different regions are displayed in different portions of a screen in some embodiments, in at least one embodiment scored nodes are not ranked by geographic region but are treated as corresponding to a single region with the nodes being arranged in ranked order on the display without being grouped into regions. In such an embodiment the nodes corresponding to different regions are simply ranked and listed in ranked order, e.g., worst nodes to best, where the worst nodes in some embodiments are indicated by the nodes having the highest overall node health score. Thus, in some implementations of a display step which may be performed in place of or as part of step 250 nodes are displayed as a single ranked list without regard to region.

Operation proceeds from step 250 to step 254 via connecting node 252. In step 254 the device used by the maintenance person and/or the overall network monitoring system 102 which may receive input via the maintenance person's device, monitors for user input, e.g., section of one of the displayed overall node health scores. An overall node health score may be selected by the user by the user tapping on the display, using a mouse to click on the displayed overall node health score to being selected or via another action such as keyboard input.

In step 256 in response to a user selecting an overall node health score detailed information showing the basis for the overall node health score is provided, e.g., displayed on the display. Thus, the maintenance person is provided with the various condition scores for the node to which the selected overall node health score corresponds and, optionally, the data used to generate the set of node condition scores. Such information allows the maintenance person to easily identify possible causes for a node being scored in a manner that indicates a low health condition. For example, the maintenance person may be able to distinguish between upstream and/or downstream problems based on whether the upstream (reverse data carrier) signal variance score suggests a problem with the reverse data carrier communications channel/communications path or if the forward data carrier signal variance score suggests a problem with the forward data channel/communications path. Alternatively if the offline device score information for a particular type of device is unusually high, e.g., a larger number of IP phones are indicated to be offline than normal, this may suggest a problem with equipment at the scored node or between the scored node and the customer premises serviced thereby, used to service and/or connect IP phones. Thus, in step 256 a maintenance person is provided with detailed information showing the basis for the overall node health score.

Operation proceeds from step 256 to step 258 in which a determination is made as to whether monitoring of the network should continue. The answer to step 258 will normally be yes but may be no in cases where the overall network monitoring system 102 is to be shut down, e.g., for service or to allow another device to take over the overall network monitoring functions. If the answer in step 258 is no indicating monitoring is to stop, operation proceeds to step 264 otherwise operation proceeds to step 260 and the value of the monitoring interval of interest is incremented to indicate that the processing and scores are to be performed for a new monitoring interval. As should be appreciated, over time the process will be repeated for a number of monitoring intervals providing historical data on overall network node health scores as well as the corresponding node condition scores for monitoring intervals corresponding to multiple different points in time.

Operation proceeds from step 260 via connecting node 262 to step 208 so that scores including overall node health scores can be generated for the new monitoring interval.

Figure 3:
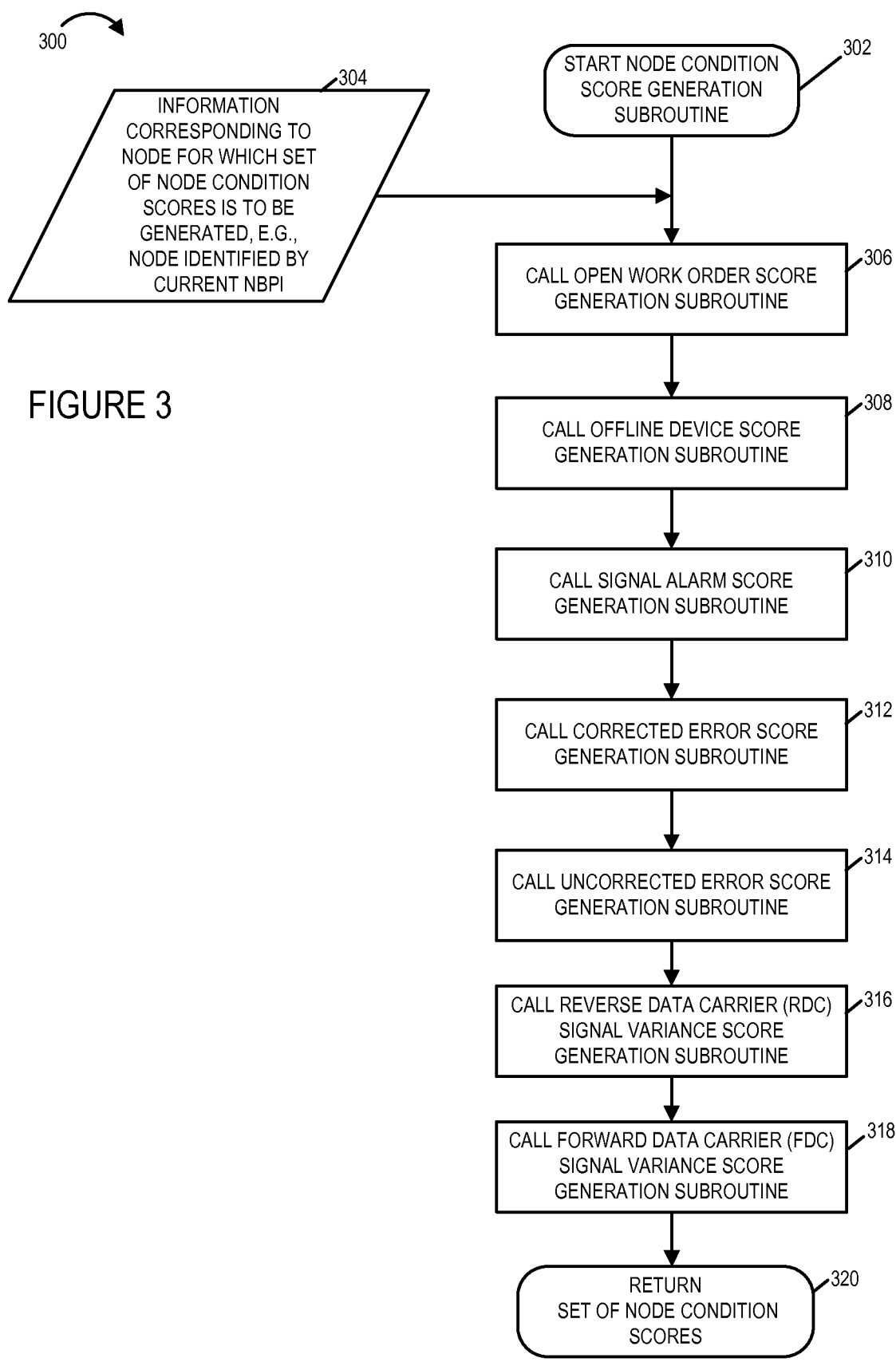
FIG. 3 illustrates the steps of an exemplary node condition score generation subroutine which may, and in some embodiments is, used to generate node condition scores, in accordance with some embodiments.

FIG. 3 illustrates the steps of an exemplary node condition score generation subroutine 300 which may, and in some embodiments is, executed by the overall network monitoring system 102. The node condition score generation subroutine maybe called by the overall node health monitoring routine 200 of FIG. 2 when a set of node condition scores are to be generated for a particular node, e.g., the node identified by the NBPI value for the monitoring interval of interest. The node condition score generation subroutine starts in step 302 during which the routine begins executing and receiving the information 304 used to perform various steps.

The input to routine 300 includes the set of information 304 corresponding the node for which the set of condition scores is to be generated, e.g., the node identified by the current NBPI value. The information 304 may, and in some embodiments does, include the open work order information 212, offline device information 214, signal alarm information 222, error information 228 and signal variance information 228 and any other information received in step 210 of FIG. 2. It should be appreciated that most of the information received in step 210 is obtained from the regional network monitoring system 103, 105. For example, the information received in step 210 other than the open work order information which is provided by billing system 107 may, and in some embodiments does, come from the regional network monitoring systems 103, 107. The region network monitoring system 103, 107 monitor and/or receive information regarding various signal and error conditions relating to devices and connections in the region to which the monitoring system 103, 107 corresponds. At least some of information provided by the regional monitoring systems may be communicated to the regional network monitoring systems 103, 107 from customer premise devices which may measure signal levels and/or know transmission levels and/or other conditions.

Figure 4:
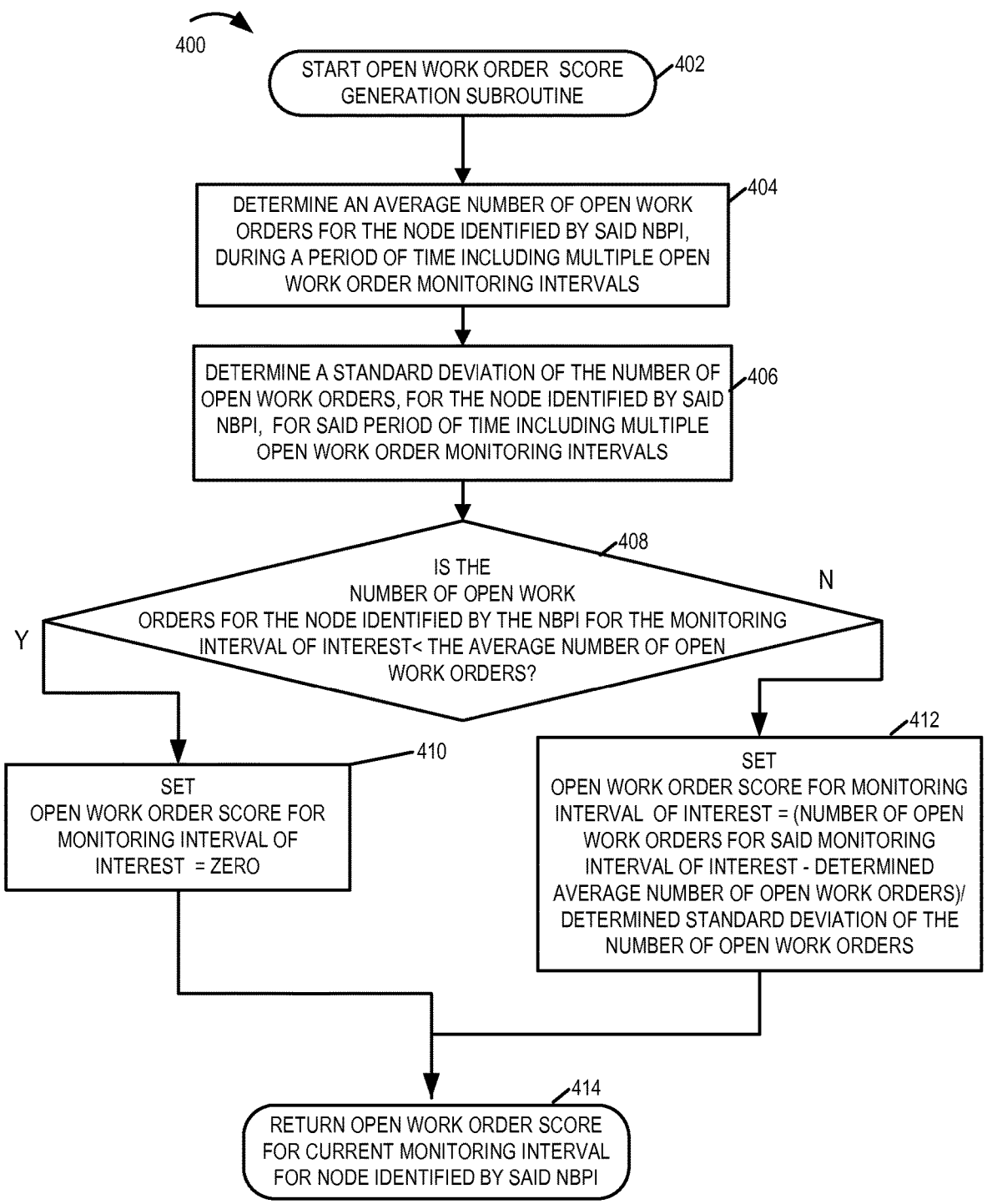
FIG. 4 illustrates an exemplary open work order score generation subroutine which may be used to generate open work order score, in accordance with some embodiments of the invention.

From step 302 operation proceeds to step 306 wherein a call is made to an open work order score generation subroutine, e.g., subroutine 400 shown in FIG. 4. The subroutine uses open work order information, e.g., open trouble work order information, from the set of information 304 and returns an open work order score. Operation proceeds from step 306 to step 308 during which a call is made to an offline device score generation subroutine, e.g., subroutine 500 shown in FIG. 5 which uses offline device information from the set of information 304. One or more offline scores are generated and returned by the offline device score generation subroutine.

Figures 6, 6A, 6B:
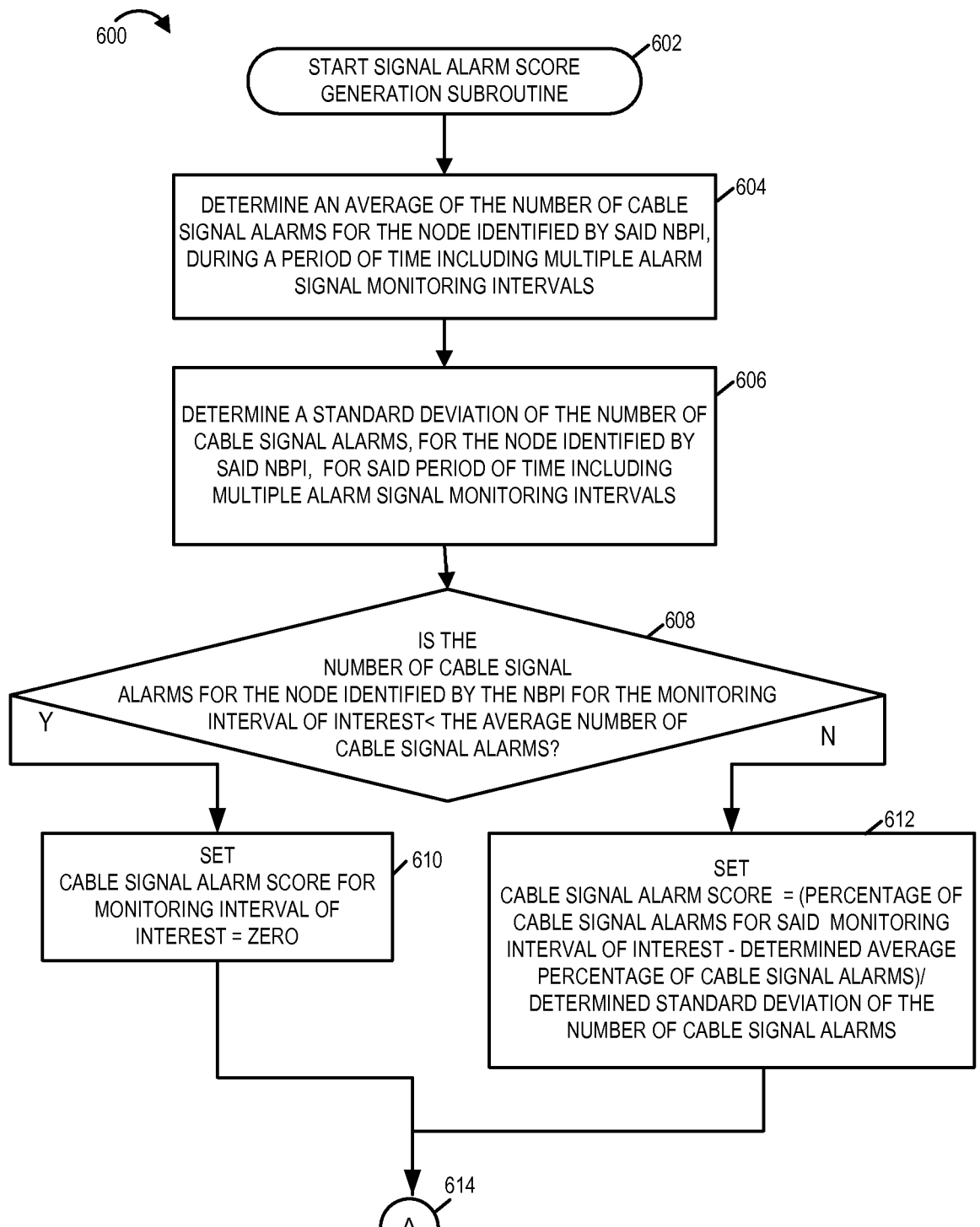
FIG. 6, which comprises the combination of FIG. 6A and FIG. 6B, is a flowchart of the steps of an exemplary signal alarm score generation subroutine in accordance with an exemplary embodiment.
Figure 6B:
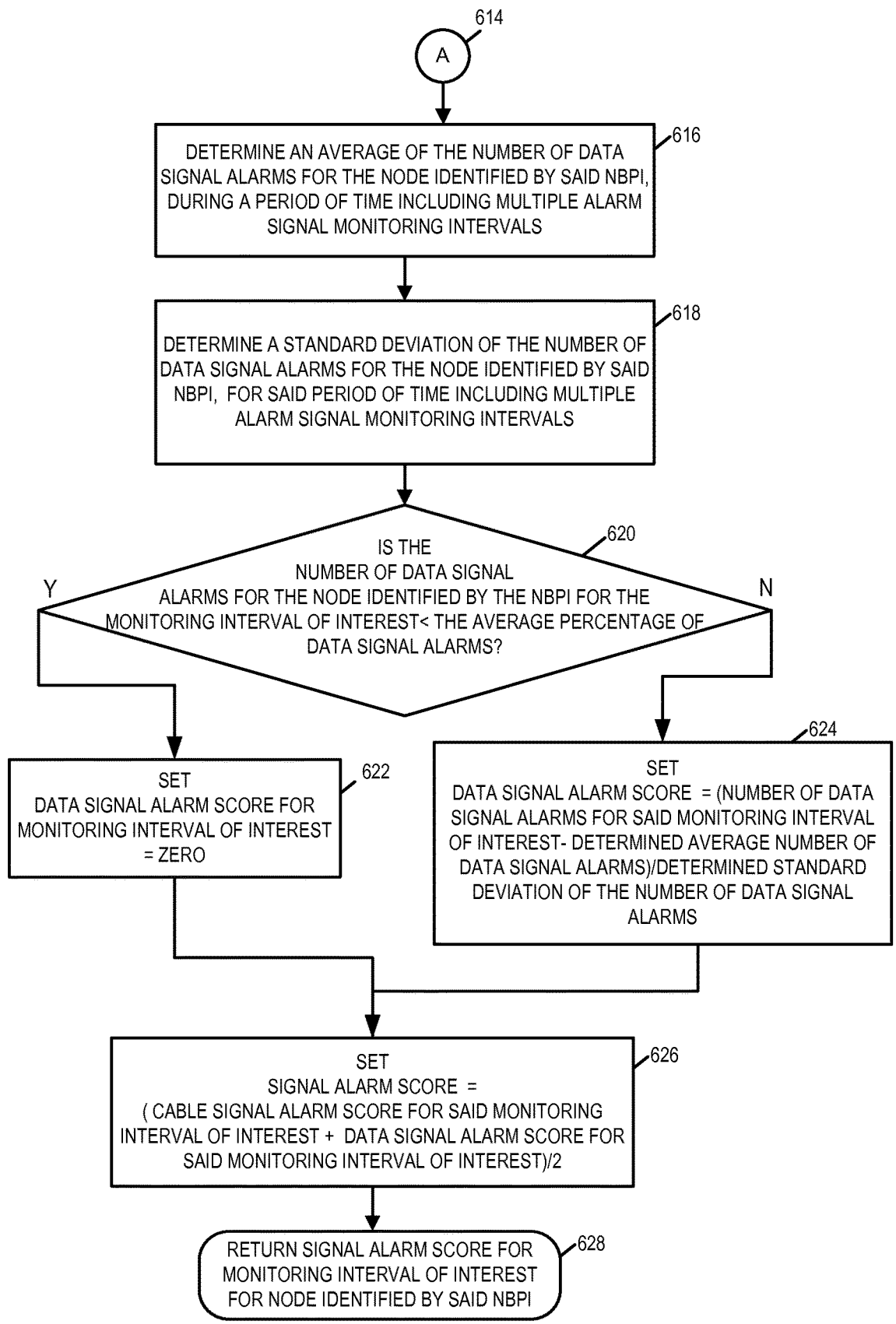

Operation proceeds from step 308 to step 310 in which a call is made to a signal alarm score generation subroutine, e.g., subroutine 600 of FIG. 6, which returns a signal alarm score generated based on signal alarm information included in information set 304. Then operation proceeds to step 312 in which a corrected error score generation subroutine, e.g., subroutine 700, is called. The corrected error score generation subroutine used corrected error information from information set 304 to generate a corrected error score which is returned in response to the call to the subroutine 700.

Figure 8:
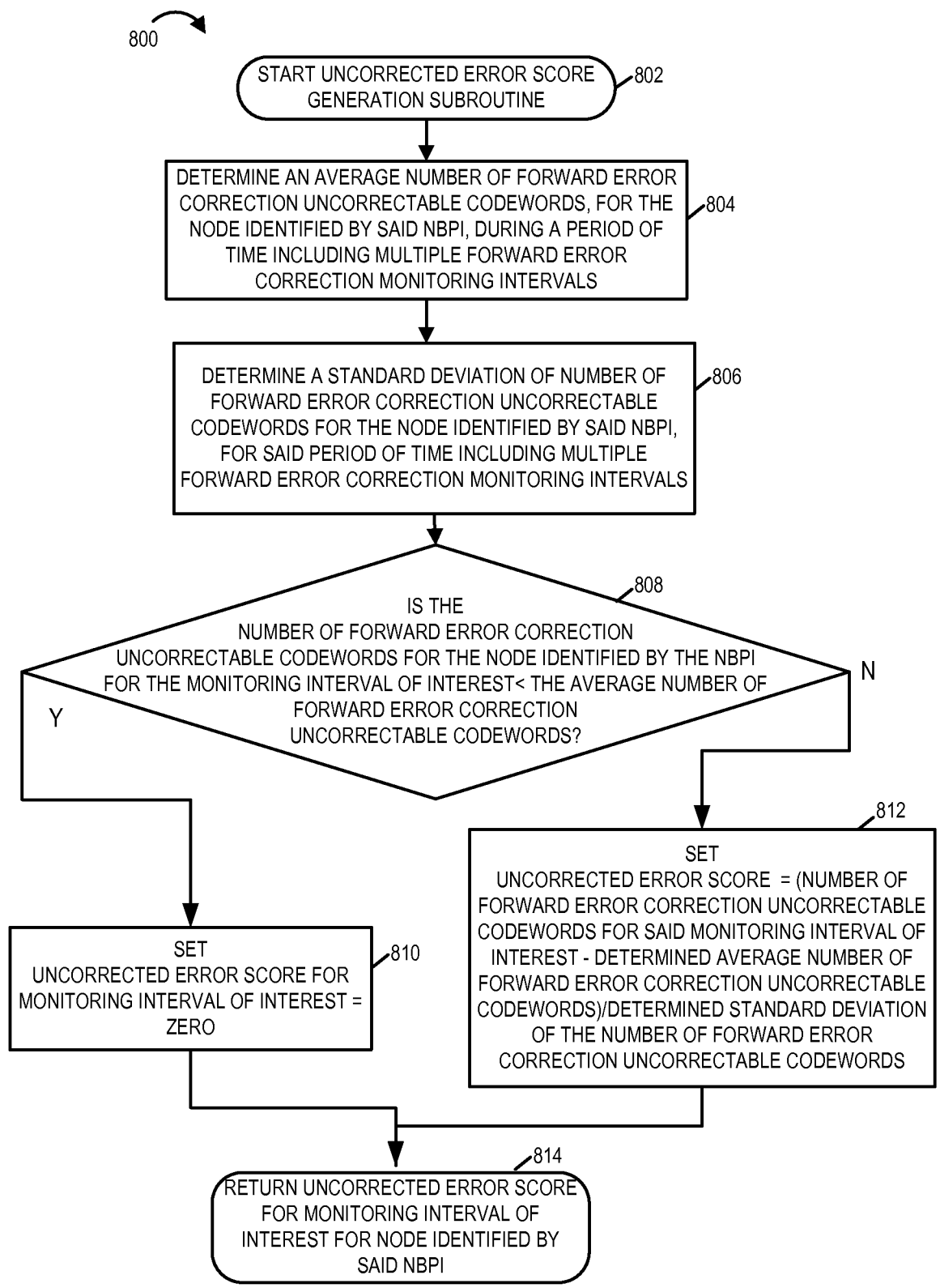
FIG. 8 is a flowchart illustrating the steps of an exemplary uncorrected error score generation subroutine in accordance with an exemplary embodiment.

Operation proceeds from step 312 to step 314 in which a call is made to a uncorrected error score generation subroutine, e.g., subroutine 800 shown in FIG. 8, which uses uncorrected error information from information set 304 to generate an uncorrected error score which is retuned in response to the subroutine call made in step 314.

Operation proceeds from step 314 to step 316. In step 316 a call is made to a reverse data carrier (RDC) signal variance score generation subroutine, e.g., subroutine 900 shown in FIG. 9, which generates an RDC signal variance score from RDC signal variance information included in information set 304 which is returned in response to the call to the subroutine 900.

Operation proceeds from step 316 to step 316. In step 316 a call is made to a forward data carrier (FDC) signal variance score generation subroutine, e.g., subroutine 1000 shown in FIG. 10, which generates an FDC signal variance score from FDC signal variance information included in information set 304. The generated FDC signal variance score is returned by the FDC signal variance score generation subroutine in response to the call made in step 318.

By the completion of step 318, a set of various scores will have been generated and included in a set of node condition scores for the node and monitoring interval to which information set 304 corresponds. The set of node condition scores is retuned in step 320 to the step or routine which called the node condition score generation subroutine 300. In some embodiments the set of generated node condition scores is stored in memory in the overall network monitoring system along with information identify the node to which it corresponds and the monitoring interval to which the generated set of node condition scores corresponds.

The exemplary open work order score generation subroutine 400 shown in FIG. 4 will now be described. The routine begins in step 402 and uses open work order information, e.g., open trouble work order information which may, e.g., indicate a number of open work orders at the end of the most recent work order monitoring interval, to generate an open work order score. From start step 402 operation proceeds to step 404 in which an average number of open work orders for the node identified by the node being processed indicator (NPBI) during a period of time including multiple open work order monitoring intervals is determined. This may be done by averaging a number of open work orders for the plurality of monitoring intervals or simply reading the average number of open work orders from information provided to the subroutine 400. Operation proceeds from step 404 to step 406, In step 406 a standard deviation of the number of open work orders, for the node identified by said NBPI, for said period of time including multiple open work order monitoring intervals is generated. The standard deviation of the number of open work orders is the square root of the variance of the number of open work orders and can be computed using readily known techniques.

While the standard deviation may be computed in step 406 in some embodiments the overall network monitoring system computes this value and provides it along with the average number of open work orders to be used. In such cases, steps 404 and 406 may be implemented by simply reading the average number of open work orders and the standard deviation of the number of open work orders from the set of information provided to the subroutine 400.

While in various embodiments of the subroutines 400, 500, 600, 700, 800, 900, 1000 the average and variance values used are generated from values corresponding to the node for which the score is being generated by the particular subroutine, in some embodiments the average and variance are generated across multiple nodes in addition to multiple monitoring time intervals. In at least some such embodiments the nodes in a region will use the same average and standard deviation values when computing work order scores and various other scores with the average and standard deviation being provided by the overall network monitoring system which generates and supplies the average and standard deviation values to be used by the core generation subroutines in one such an embodiment. In such embodiments the average and standard deviation will normally be based on information corresponding to the node for which the score is being generated but may also be based on information corresponding to other nodes in the same region as the node for which the score is being generated.

Operation proceeds from step 406 to step 408 in which a determination is made as to whether the number of open work orders, e.g., open trouble work orders, for the node identified by the NBPI for the monitoring interval of interest is less than the average number of open work orders. If the number of open work orders is determined to be less than the average number of open work orders operation proceeds to step 410 wherein the open work order score for the monitoring interval of interest is set to zero. Thus, when the number of open work orders is below average, a zero open work order score will be generated and the open work order score will not add anything to the generated overall node heath score when the overall node health score is generated. However, if in step 408 the number of open work orders is determined to be less than the average number of open work orders operation proceeds to step 412.

In step 412 the open work order score for the monitoring interval of interest is set equal to the number of open work orders for said monitoring interval of interest minus the determined average number of open work orders divided by the determined standard deviation of the number of open work orders. Thus, the open work order score takes into consideration where the score is within the range of work order scores which can be expected during a period of time based on past measurements.

Steps 410 and 412 both proceed to step 414. In step 414 the generated open work order score for the current monitoring interval for the node identified by the NBPI is returned, e.g., to the routine which called subroutine 400.

Figure 5A:
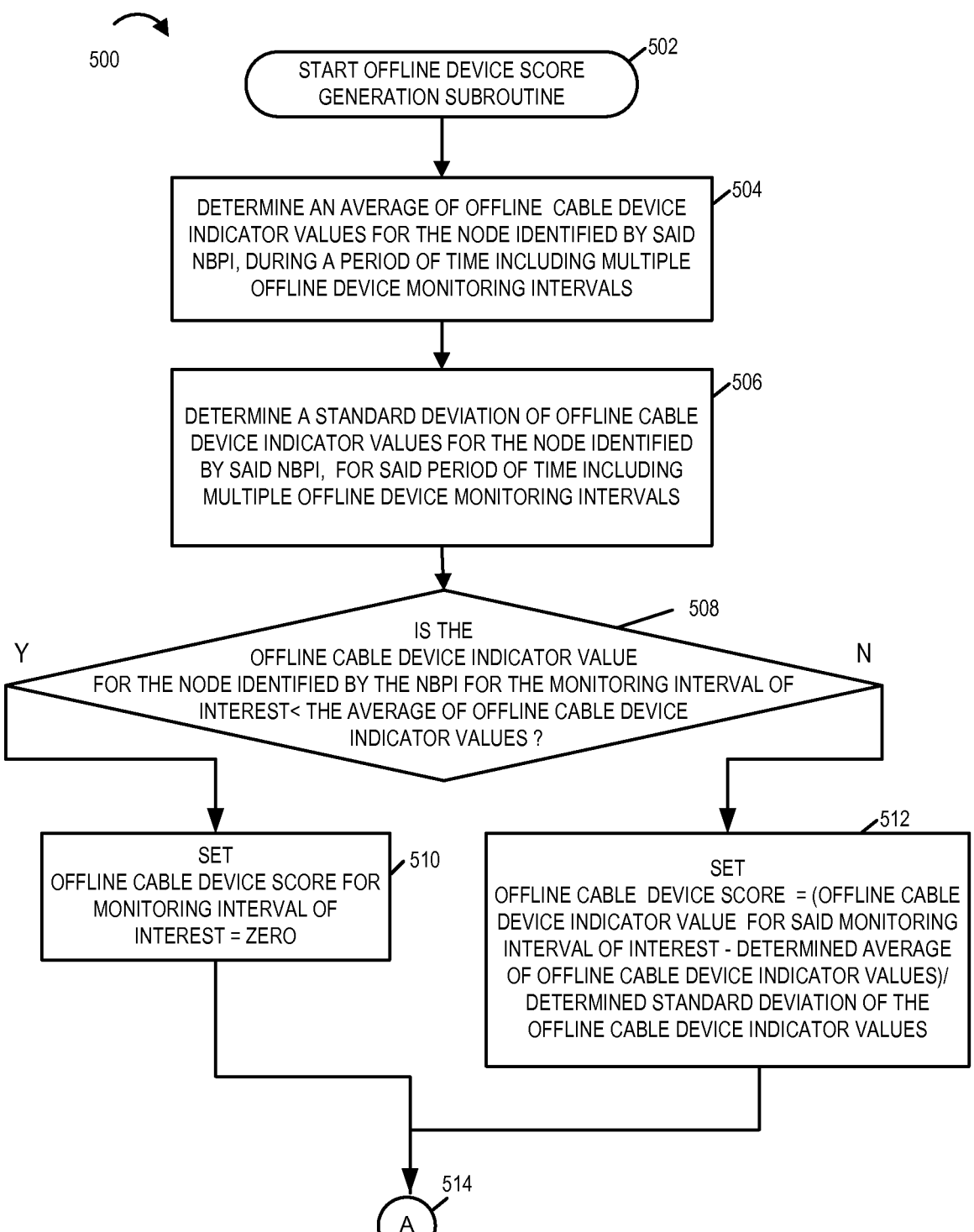
FIG. 5, which comprises the combination of FIG. 5A, FIG. 5B, and FIG. 5C, is a flowchart illustrating the steps of an exemplary offline device score generation subroutine in accordance with an exemplary embodiment.
Figure 5B:
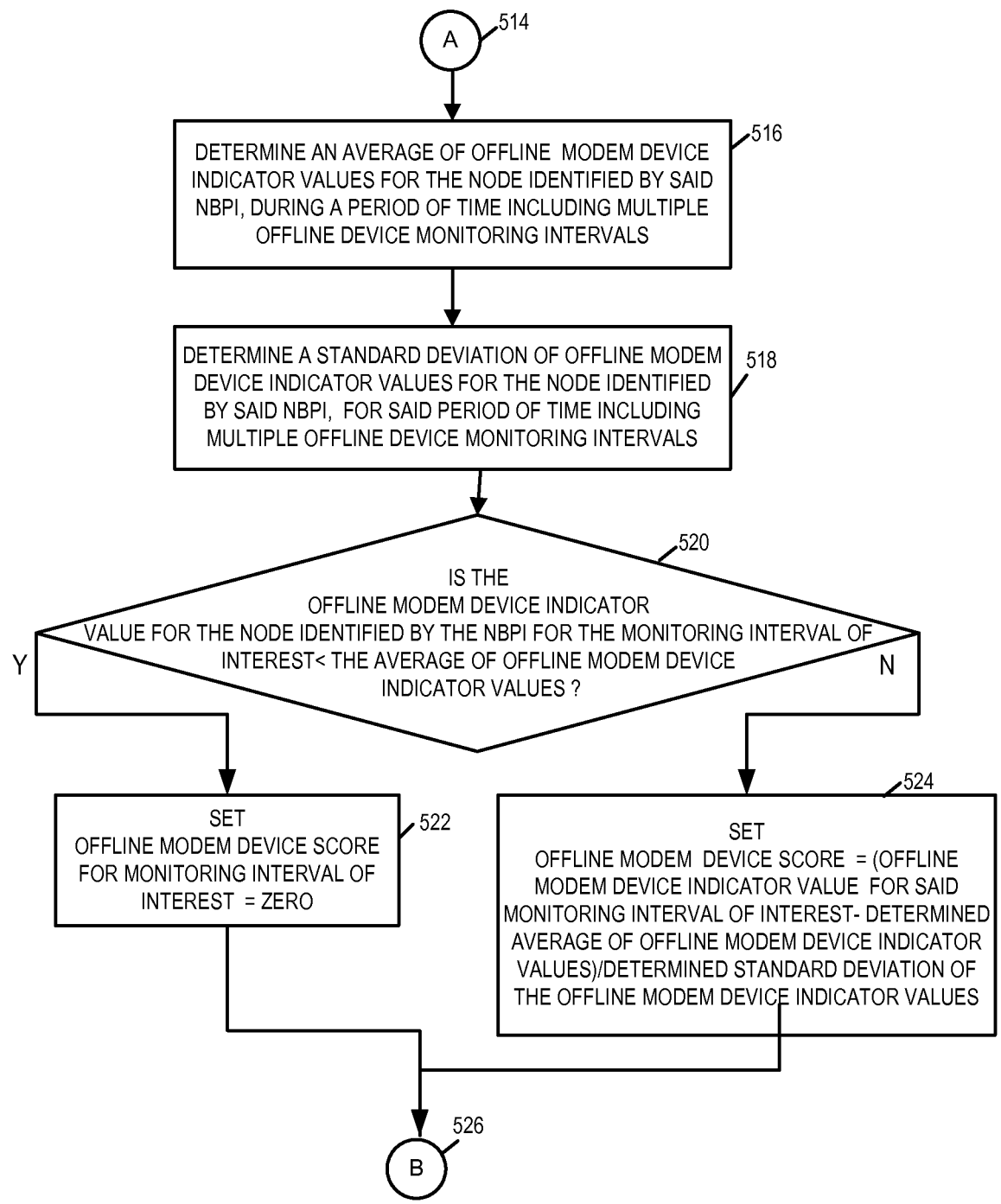
Figure 5C:
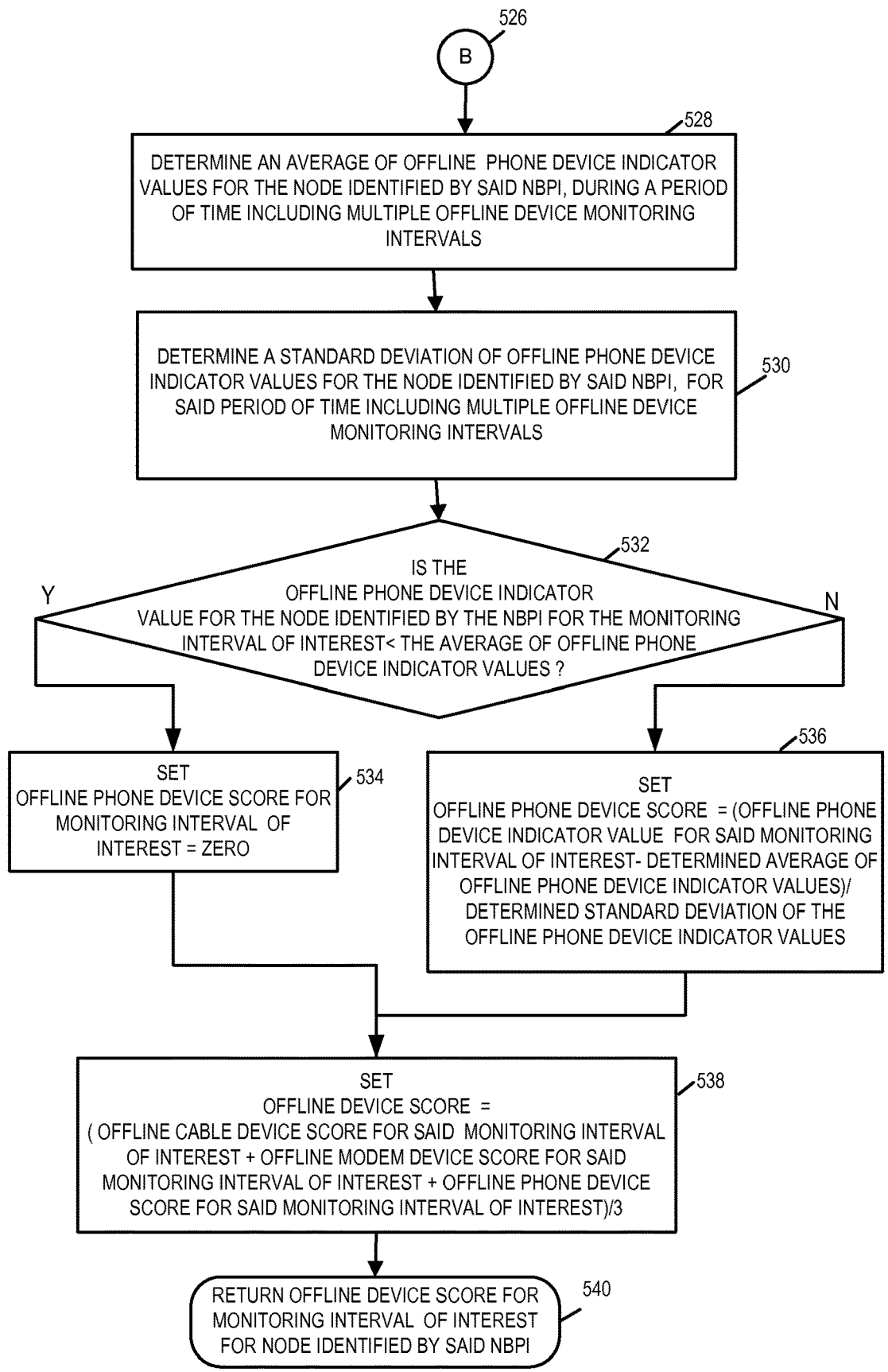

FIG. 5, comprising the combination of FIG. 5A, FIG. 5B, and FIG. 5C, is a flowchart 500 of the steps of an exemplary offline device score generation subroutine in accordance with an exemplary embodiment. The method of flowchart 500 may be implemented by the overall network monitoring system 102 of FIG. 1.

FIG. 5 illustrates the steps of an exemplary offline score generation subroutine 500. Operation of the exemplary offline score generation subroutine 500 starts in step 502 and proceeds to step 504. In step 504 the subroutine determines an average of offline cable device indicator values for the node identified by said NBPI, during a period of time including multiple offline device monitoring intervals. Operation proceeds from step 504 to step 506. In step 506 the subroutine determines a standard deviation of offline cable device indicator values for the node identified by said NBPI, for said period of time including multiple offline device monitoring intervals. Operation proceeds from step 506 to step 508.

In step 508, the subroutine determines whether or not the offline cable device indicator value for the node identified by the NBPI for the monitoring interval of interest is less than the average of offline cable device indicator values. If in step 508, it is determined that the offline cable device indicator value for the node identified by the NBPI for the monitoring interval of interest is less than the average of offline cable device indicator values, then operation proceeds from step 508 to step 510. However, if in step 508, it is determined that the offline cable device indicator value for the node identified by the NBPI for the monitoring interval of interest is not less than the average of offline cable device indicator values, then operation proceeds from step 508 to step 512.

Returning to step 510, in step 510 the subroutine sets offline cable device score for the monitoring interval of interest equal to zero. Returning to step 512, in step 512 the subroutine sets offline cable device score for the monitoring interval of interest=(offline cable device indicator value for said monitoring interval of interest−determined average of offline cable device indicator values)/determined standard deviation of the offline cable device indicator values. Operation proceeds from step 510 or step 512, via connecting node A 514, to step 516.

In step 516 the subroutine determines an average of offline modem device indicator values for the node identified by said NBPI, during a period of time including multiple offline device monitoring intervals. Operation proceeds from step 516 to step 518. In step 518 the subroutine determines a standard deviation of offline modem device indicator values for the node identified by said NBPI, for said period of time including multiple offline device monitoring intervals. Operation proceeds from step 518 to step 520.

In step 520, the subroutine determines whether or not the offline modem device indicator value for the node identified by the NBPI for the monitoring interval of interest is less than the average of offline modem device indicator values. If in step 520, it is determined that the offline modem device indicator value for the node identified by the NBPI for the monitoring interval of interest is less than the average of offline modem device indicator values, then operation proceeds from step 520 to step 522. However, if in step 520, it is determined that the offline modem device indicator value for the node identified by the NBPI for the monitoring interval of interest is not less than the average of offline modem device indicator values, then operation proceeds from step 520 to step 524.

Returning to step 522, in step 522 the subroutine sets offline modem device score for the monitoring interval of interest equal to zero. Returning to step 524, in step 524 the subroutine sets offline modem device score for the monitoring interval of interest=(offline modem device indicator value for said monitoring interval of interest minus the determined average of offline modem device indicator values) divided by the determined standard deviation of the offline modem device indicator values. Operation proceeds from step 522 or step 524, via connecting node B 526, to step 528.

In step 528 the subroutine determines an average of offline phone device indicator values for the node identified by said NBPI, during a period of time including multiple offline device monitoring intervals. Operation proceeds from step 528 to step 530. In step 530 the subroutine determines a standard deviation of offline phone device indicator values for the node identified by said NBPI, for said period of time including multiple offline device monitoring intervals. Operation proceeds from step 530 to step 532.

In step 532, the subroutine determines whether or not the offline phone device indicator value for the node identified by the NBPI for the monitoring interval of interest is less than the average of offline phone device indicator values. If in step 532, it is determined that the offline phone device indicator value for the node identified by the NBPI for the monitoring interval of interest is less than the average of offline phone device indicator values, then operation proceeds from step 532 to step 534. However, if in step 532, it is determined that the offline phone device indicator value for the node identified by the NBPI for the monitoring interval of interest is not less than the average of offline phone device indicator values, then operation proceeds from step 532 to step 536.

Returning to step 534, in step 534 the subroutine sets offline phone device score for the monitoring interval of interest equal to zero. Returning to step 536, in step 536 the subroutine sets offline phone device score for the monitoring interval of interest=(offline phone device indicator value for said monitoring interval of interest−determined average of offline phone device indicator values)/determined standard deviation of the offline phone device indicator values. Operation proceeds from step 534 or step 536 to step 538.

In step 538, the subroutine sets offline device score= (offline cable device score for said monitoring interval of interest+offline modem device score for said monitoring interval of interest plus offline phone score for said monitoring interval of interest) divided by 3. Operation proceeds from step 538 to step 540, in which the subroutine returns the offline device score for the monitoring interval of interest for the node identified by said NBPI.

FIG. 6, comprising the combination of FIG. 6A and FIG. 6B, is a flowchart 600 of the steps of an exemplary signal alarm score generation subroutine in accordance with an exemplary embodiment. The exemplary method of flowchart 600 may be implemented by overall network monitoring system 102 of FIG. 1.

Exemplary start signal score generation subroutine starts in step 602 and operation proceeds to step 604. In step 604, the subroutine determines an average of the number of cable signal alarms for the node identified by the NBPI, during a period of time including multiple alarm signal monitoring intervals. Operation proceeds from step 604 to step 606. In step 606 the subroutine determines a standard deviation of the number of cable signal alarms, for the node identified by the NBPI, for said period of time including multiple alarm signal monitoring intervals. Operation proceeds from step 606 to step 608.

In step 608, the subroutine determines if the number of cable signal alarms for the node identified by the NBPI for the monitoring interval of interest is less than the average number of cable signal alarms. If in step 608, it is determined that the number of cable signal alarms for the node identified by the NBPI for the monitoring interval of interest is less than the average number of cable signal alarms, then operation proceeds from step 608 to step 610. However, if in step 608, it is determined that the number of cable signal alarms for the node identified by the NBPI for the monitoring interval of interest is not less than the average number of cable signal alarms, then operation proceeds from step 608 to step 612.

Returning to step 610, in step 610 the subroutine sets the cable signal alarm score for the monitoring interval of interest=zero. Returning to step 612, in step 612 the subroutine sets the cable signal alarm score for the monitoring interval of interest=(percentage of cable signal alarms for said monitoring signal of interest−determined average percentage of cable signal alarms)/determined standard deviation of the number of cable signal alarms. Operation proceeds from step 610 or step 612, via connecting node A 614, to step 616.

In step 612 the subroutine determines an average of the number of data signal alarms for the node identified by said NBPI, during a period of time including multiple alarm signal monitoring intervals. Operation proceeds from step 616 to step 618. In step 618 the subroutine determines a standard deviation of the number of data signal alarms for the node identified by said NBPI, for said period of time including multiple alarm signal monitoring intervals. Operation proceeds from step 618 to step 620.

In step 620 the subroutines determines whether or not the number of data signal alarms for the node identified by the NBPI for the monitoring interval of interest is less than the average percentage of data signal alarms. If in step 620, it is determined that the number of data signal alarms for the node identified by the NBPI for the monitoring interval of interest is less than the average percentage of data signal alarms, then operation proceeds from step 620 to step 622. However, If in step 620, it is determined that the number of data signal alarms for the node identified by the NBPI for the monitoring interval of interest is not less than the average percentage of data signal alarms, then operation proceeds from step 620 to step 624.

Returning to step 622, in step 622 the subroutine sets the data signal alarm score of the monitoring interval of interest equal to zero. Returning to step 624, in step 624, the subroutine sets the data signal alarm score of the monitoring interval of interest=(number of data signal alarms for said monitoring interval of interest−determined average number of data signal alarms)/determined standard deviation of the number of data signal alarms. Operation proceeds from step 622 or step 624 to step 626.

In step 626 the subroutine sets signal alarm score=(cable signal alarm score for said monitoring interval of interest+ data signal alarm score for said monitoring signal of interest)/2. Operation proceeds from step 626 to step 628, in which the subroutine returns the signal alarm score for the monitoring interval of interest for the node identified by said NBPI.

Figure 7:
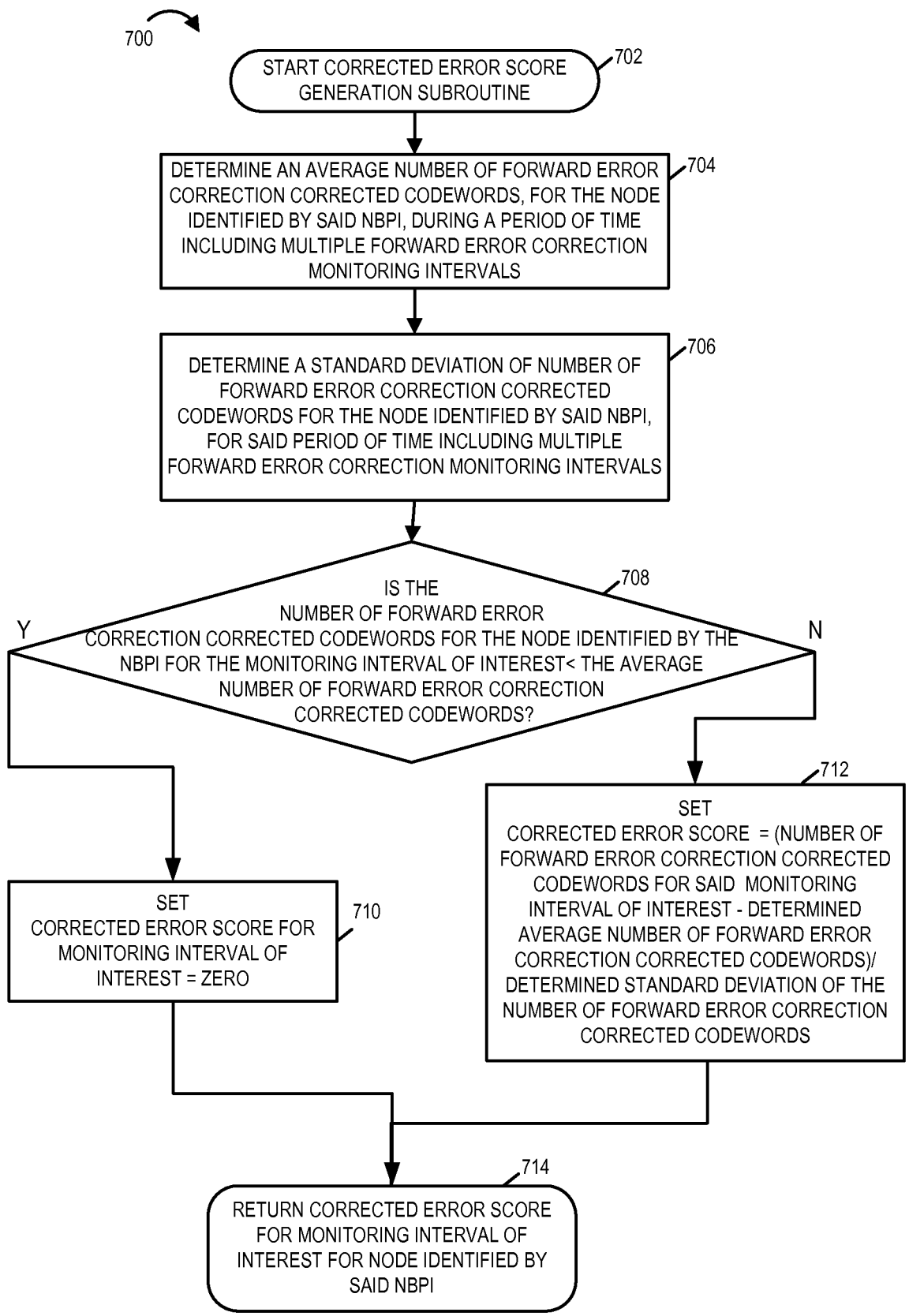
FIG. 7 is a flowchart illustrating the steps of an exemplary corrected error score generation subroutine in accordance with an exemplary embodiment.

FIG. 7 is a flowchart 700 of the steps of an exemplary corrected error score generation subroutine in accordance with an exemplary embodiment. The exemplary method of flowchart 700 may be implemented by overall network monitoring system 102 of FIG. 1.

Exemplary corrected error score generation subroutine starts in step 702 and operation proceeds to step 704. In step 704, the subroutine determines an average number of forward error correction corrected codewords, for the node identified by said NBPI, during a period of time including multiple forward error correction monitoring intervals. Operation proceeds from step 704 to step 706.

In step 706, the subroutine determines a standard deviation of number of forward error correction corrected codewords for the node identified by said NBPI, for said period of time including multiple forward error correction monitoring intervals. Operation proceeds from step 706 to step 708.

In step 708, the subroutine determines whether or not the number of forward error correction corrected codewords for the node identified by the NBPI for the monitoring interval of interest is less than the average number of forward error correction corrected codewords. If it is determined in step 708 that the number of forward error correction corrected codewords for the node identified by the NBPI for the monitoring interval of interest is less than the average number of forward error correction corrected codewords, then operation proceeds from step 708 to step 710. If it is determined in step 708 that the number of forward error correction corrected codewords for the node identified by the NBPI for the monitoring interval of interest is not less than the average number of forward error correction corrected codewords, then operation proceeds from step 708 to step 712.

Returning to step 710, in step 710 the subroutine sets corrected error score for monitoring interval of interest equal to zero. Returning to step 712, in step 712 the subroutine sets corrected error score for monitoring interval of interest= (number of forward error correction corrected codewords for said monitoring interval of interest−determined average number of forward error correction corrected codewords)/ determined standard deviation of the number of forward error correction corrected codewords. Operation proceeds from step 710 or step 712 to step 714, in which the subroutine returns the corrected error score for the monitoring interval of interest for the node identified by said NBPI.

FIG. 8 is a flowchart 800 of the steps of an exemplary uncorrected error score generation subroutine in accordance with an exemplary embodiment. The exemplary method of flowchart 800 may be implemented by overall network monitoring system 102 of FIG. 1.

Exemplary uncorrected error score generation subroutine starts in step 802 and operation proceeds to step 804. In step 804, the subroutine determines an average number of forward error correction uncorrectable codewords, for the node identified by said NBPI, during a period of time including multiple forward error correction monitoring intervals. Operation proceeds from step 804 to step 806.

In step 806, the subroutine determines a standard deviation of number of forward error correction uncorrectable codewords for the node identified by said NBPI, for said period of time including multiple forward error correction monitoring intervals. Operation proceeds from step 806 to step 808.

In step 808, the subroutine determines whether or not the number of forward error correction uncorrectable codewords for the node identified by the NBPI for the monitoring interval of interest is less than the average number of forward error correction uncorrectable codewords. If it is determined in step 808 that the number of forward error correction uncorrectable codewords for the node identified by the NBPI for the monitoring interval of interest is less than the average number of forward error correction uncorrectable codewords, then operation proceeds from step 808 to step 810. If it is determined in step 808 that the number of forward error correction uncorrectable codewords for the node identified by the NBPI for the monitoring interval of interest is not less than the average number of forward error correction uncorrectable codewords, then operation proceeds from step 808 to step 812.

Returning to step 810, in step 810 the subroutine sets uncorrected error score for monitoring interval of interest equal to zero. Returning to step 812, in step 812 the subroutine sets uncorrected error score for monitoring interval of interest=(number of forward error correction uncorrectable codewords for said monitoring interval of interest− determined average number of forward error correction uncorrectable codewords)/determined standard deviation of the number of forward error correction uncorrectable codewords. Operation proceeds from step 810 or step 812 to step 814, in which the subroutine returns the uncorrected error score for the monitoring interval of interest for the node identified by said NBPI.

Figure 9:
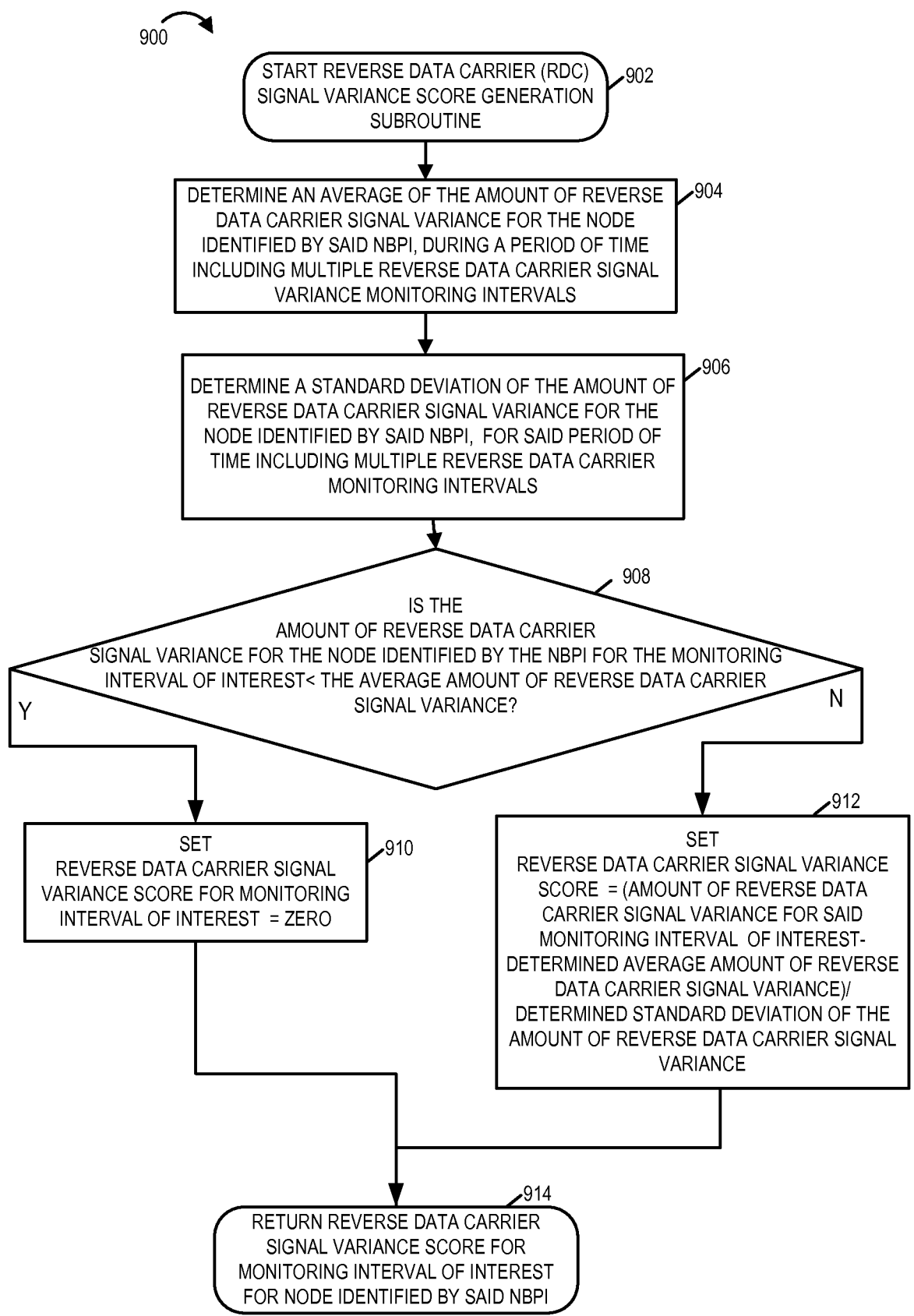
FIG. 9 is a flowchart illustrating the steps performed when a reverse data carrier (RDC) signal variance score generation subroutine is executed, in accordance with some embodiments of the invention.

FIG. 9 is a flowchart 900 illustrating the steps performed when the reverse data carrier (RDC) signal variance score generation subroutine is executed, in accordance with some embodiments of the invention. The reverse data carrier (RDC) signal variance score generation subroutine shown in flowchart 900 starts in step 902 where the subroutine is executed, e.g., in the monitoring system 102.

Operation proceeds from step 902 to step 904. In step 904 an average of an amount of reverse data carrier signal variance, during a period of time including multiple reverse data carrier monitoring intervals, for a node identified by the NBPI is determined.

Operation proceeds from step 904 to step 906. In step 906 a standard deviation of the amount of reverse data carrier signal variance for the node identified by the NBPI during the period of time including multiple reverse data carrier monitoring intervals is determined.

Operation proceeds from step 906 to step 908. In step 908 it is determined whether the amount of reverse data carrier signal variance for the node identified by the NBPI for the monitoring interval of interest is less than the average amount of reverse data carrier signal variance. If in step 908 it is determined that the amount of reverse data carrier signal variance for the node identified by the NBPI for the monitoring interval of interest is less than the average amount of reverse data carrier signal variance, the operation proceeds from step 908 to step 910, otherwise the operation proceeds to step 912.

In step 910 the reverse data carrier signal variance score for the monitoring interval of interest is set to be equal to zero. Operation proceeds from step 910 to step 914.

Returning to step 912. In step 912 the reverse data carrier signal variance score is set to be equal to the amount of reverse data carrier signal variance for the monitoring interval of interest–(minus) determined average amount of reverse data carrier signal variance/determined standard deviation of the amount of reverse data carrier signal variance. Operation proceeds from step 912 to step 914.

Referring to step 914. In step 914 the reverse data carrier signal variance score for the monitoring interval of interest for the node identified by the NBPI is returned.

Figure 10:
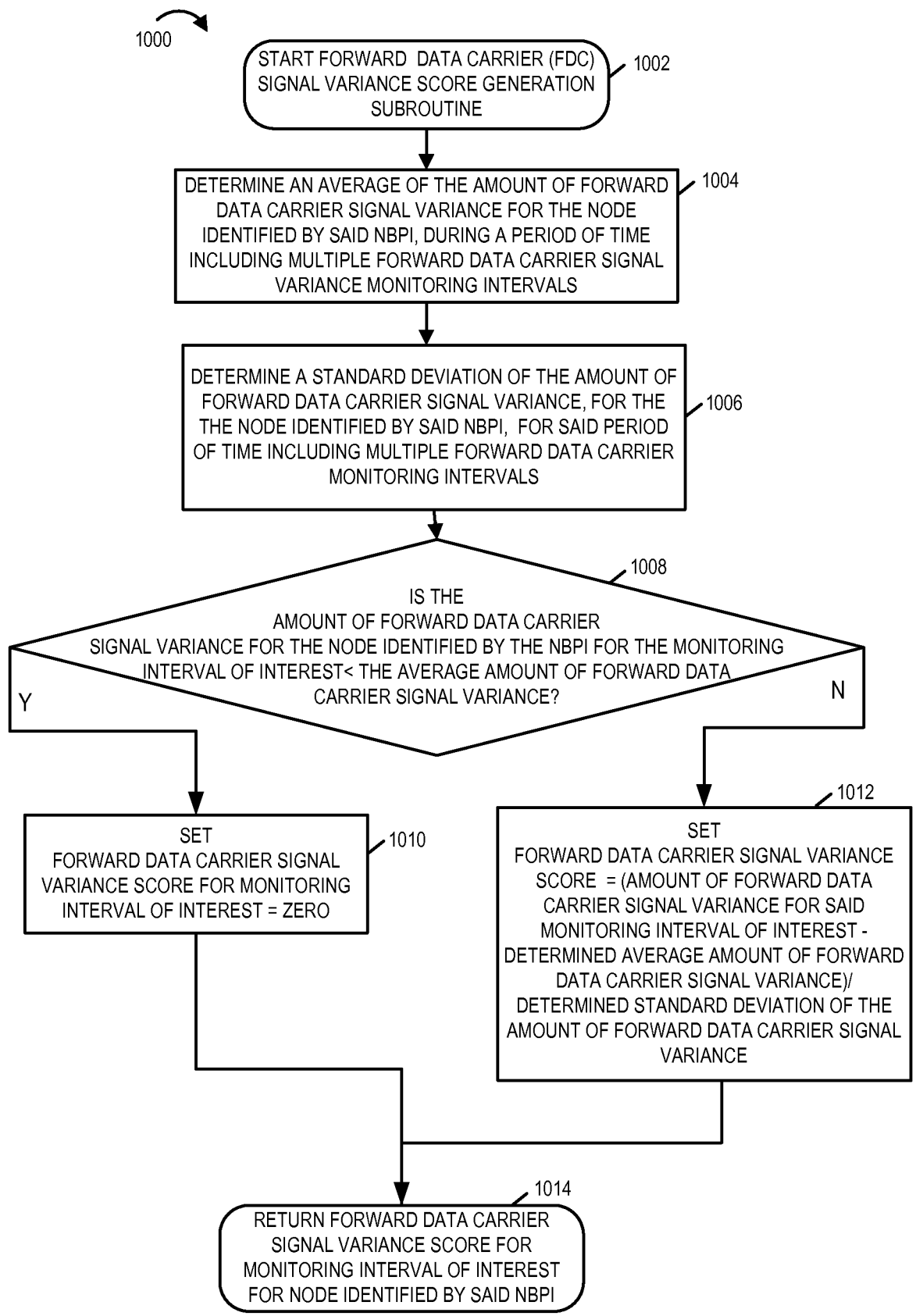
FIG. 10 is a flowchart illustrating the steps performed when a forward data carrier (FDC) signal variance score generation subroutine is executed, in accordance with some embodiments of the invention.

FIG. 10 is a flowchart 1000 illustrating the steps performed when a forward data carrier (FDC) signal variance score generation subroutine is executed, in accordance with some embodiments of the invention. The forward data carrier (FDC) signal variance score generation subroutine shown in flowchart 1000 starts in step 1002 where the subroutine is executed.

Operation proceeds from step 1002 to step 1004. In step 1004 an average of an amount of forward data carrier signal variance for a node identified by the NBPI, during a period of time including multiple forward data carrier monitoring intervals, is determined.

Operation proceeds from step 1004 to step 1006. In step 1006 a standard deviation of the amount of forward data carrier signal variance, for the node identified by the NBPI during the period of time including multiple forward data carrier monitoring intervals is determined.

Operation proceeds from step 1006 to step 1008. In step 908 it is determined whether the amount of forward data carrier signal variance for the node identified by the NBPI for the monitoring interval of interest is less than the average amount of forward data carrier signal variance. If in step 1008 it is determined that the amount of forward data carrier signal variance for the node identified by the NBPI for the monitoring interval of interest is less than the average amount of forward data carrier signal variance, the operation proceeds from step 1008 to step 1010, otherwise the operation proceeds to step 1012.

In step 1010 the forward data carrier signal variance score for the monitoring interval of interest is set to be equal to zero. Operation proceeds from step 1010 to step 1014.

Returning to step 1012. In step 1012 the forward data carrier signal variance score for the monitoring interval of interest is set to be equal to the amount of forward data carrier signal variance for the monitoring interval of interest–(minus) the determined average amount of forward data carrier signal variance/determined standard deviation of the amount of forward data carrier signal variance. Operation proceeds from step 1012 to step 1014.

Referring to step 1014. In step 1014 the forward data carrier signal variance score for the monitoring interval of interest for the node identified by the NBPI is returned.

FIG. 11 is a flowchart 1100 illustrating the steps performed when a overall node health score generation subroutine is executed, in accordance with some embodiments of the invention. The overall node health score generation subroutine shown in flowchart 1100 starts in step 1102 where the subroutine is executed.

The data block 1104 includes the received information corresponding to node for which the overall node health score is to be generated, i.e., node identified by the NBPI. The data block 1104 is supplied as an input and the included information is used in various embodiments to generate the overall node health score for a given node. In some embodiments the information included in data block 1014 is received and stored in the monitoring system 102 and is retrieved for use at the time when the overall node health score generation subroutine is executed.

Operation proceeds to step 1106. In step 1106 the overall node health score, for the given node to which the information in data block 1104 corresponds, is set to be =(open work order score corresponding to the node)*(open work score weighting factor)+(offline device score for the node)*(offline device weighting factor)+(signal alarm score for the node)*(signal alarm weighting factor)+(corrected error score for the node)*(corrected error weighting factor)+(reverse data channel signal variance score for the node)*(reverse data channel signal variance weighting factor)+(forward data channel signal variance score for the node)*(forward data channel signal variance weighting factor).

Operation proceeds to step 1108. In step 1108 the overall node health score for the node is returned.

Various embodiments are possible beyond those which have already been described and the invention is not limited to the particular examples which have been discussed above.

One exemplary embodiment includes an apparatus for monitoring a communications system, including a receiver configured to receive information corresponding to nodes in a network, said nodes including at least a first node, said information corresponding to nodes in the network including at least first information relating to a first network portion which includes customer premise devices which communicate via said first node with other devices, said first information including at least first offline device information, first communication error information, and first signal level variance information, a control module configured to control processing of information corresponding to nodes in said network, a node condition score generation module configured to generate sets of node condition scores for nodes specified by said control module, said sets of node condition scores including at least a first set of node condition scores corresponding to the first node, said first set of first node condition scores generated by said node condition score generation module including a first offline device score based on said first offline device information, a first error score based on the first detected error information, and a first signal level variance score based on the first signal level variance information, an overall node health score generation module configured to generate an overall node health scores for nodes specified by said control module, said overall node health scores including a first node health score corresponding to said first node generated by said overall node health score generation module based on a weighted combination of the scores included in said first set of node condition scores, memory for storing overall node health scores generated by said overall node health score generation module, and a transmitter configured to communicate said overall first node heath score to a device used by a maintenance person. In some embodiments the offline device information includes a measured number of offline device of a first type. The node condition score generation module may and sometime does include an offline device score generation module configured to generate said first offline device score based on the measured number of offline devices of a first type, the measured number of offline devices of the first type being a number of devices of the first type which were offline during an offline measurement period of interest for which the first offline device score is generated.

In some embodiments the node condition score generation module includes a determination module configured to determine an average number of devices of the first type which were offline during a period of time including multiple offline measurement time intervals, and the offline device score generation module is further configured to set said first offline device score to zero, as part of generating said first offline device score, when said measured number of devices of the first type which were offline during the offline measurement period of interest is less than said average number of devices of the first type which were offline. In such an exemplary embodiment the node condition score generation module sometimes includes a standard deviation determination module configured to determine a standard deviation of the number of devices of the first type which were offline during said period of time including said multiple offline measurement time intervals; and the offline device score generation module is further configured to, as part of generating said first offline device score, set said first offline device score to the number of devices of the first type which were offline during said offline measurement period of interest minus said average number of offline devices of the first type divided by said standard deviation of the number of devices of the first type which were offline during said period of time including said multiple offline measurement time intervals, when the number of devices of the first type which were offline during said period of time including said multiple offline measurement time intervals is equal to or greater than said average number of devices of the first type which were off line.

The overall node health score generation module includes, in at least one embodiment, a weighted sum generation module configured to generate a weighted sum of scores included in said set of first node condition scores with the weighted sum generation module being configured to weight said first error score more heavily than said first offline device score, as part of being configured to generate said weighted sum.

In some embodiments the first error score is an uncorrectable detected error score; and the weighted sum generation module is further configured to weight said signal variance score with a weight that has the lowest weight used to weight a score in said first set of scores, as part of being configured to generate said weighted sum.

The receiver may, and sometimes is, further configured to receive, as part of said first information, first work order information and first signal alarm information and the node condition score generation module is sometimes further configured to generate a first work order score and a first alarm signal score, as part of being configured to generate said first set of node condition scores.

The weighted sum generation module is sometimes further configured to weight said work order score and said alarm signal score evenly, as part of being configured to generate said weighted sum and in at least some embodiments the overall first node health score is an average of weighted scores.

In some embodiments the receiver is further configured to receive information corresponding to a second node relating to a second network portion which includes customer premise devices which communicate via said second node with other devices, said information including at least second offline device information, second communication error information, and second signal level variance information and the node condition score generation module is further configured to generate a second set of node condition scores from said received information corresponding to the second node, said second set of node condition scores generated by said node condition score generation module including a second offline device score based on said second offline device information, a second signal alarm score based on the second signal alarm information, a second error score based on the second detected error information, and a second signal variance score based on the second signal variance information. In some such embodiments the overall node health score generation module is further configured to generate an overall second node health score corresponding to said second node based on a weighted combination of the scores included in said set of second node condition scores and the transmitter is further configured to communicate said overall second node heath score to said device used by the maintenance person.

In some implementations the apparatus for generating overall node health scores includes a ranking module configured to rank the first and second nodes according to said first and second node health scores; and an output device configured to display the first and second node information including said first and second overall node health scores in ranked order. In some embodiments the first and second nodes correspond to a first geographic region served by a first headed, said first and second nodes corresponding to first and second non-overlapping sub-regions of said first geographic region. The output device of the apparatus may, and in some embodiments is, configured to display node health information corresponding to third and fourth network nodes corresponding to different sub-regions of a second geographic area served by a second network headend along with node health information corresponding to said first and second network nodes.

In at least some embodiments the output device is configured to display network node health scores corresponding to said first geographic region in a first portion of a display screen in ranked order with information identifying said first region and display network node health scores corresponding to said second geographic region in a second portion of said display screen in ranked order with information identifying said second region, said first and second portions of said display screen being non-overlapping portions of said display screen.

In the above described methods, in some embodiments, each step may be performed by one or more different software instructions executed by a computer processor, e.g., a central processing unit (CPU). At least one system implemented in accordance with the present invention includes a means for implementing each of the various steps which are part of the methods of the present invention. Each means may be, e.g., an instruction, processor, hardware circuit and/or combination of elements used to implement a described step. Some embodiments are directed to a processor, e.g., in a network monitoring device, being configured to control the network monitoring device to perform one, more or all the steps of the routines and/or subroutines described herein.

Many of the above described methods or method steps can be implemented using machine, e.g., computer, executable instructions, such as software, included in a non-transitory machine, e.g., computer, readable medium used to control a machine, e.g., general purpose computer with or without additional hardware, to implement all or portions of the above described methods, e.g., in one or more nodes. The machine readable medium may be, e.g., a memory device, e.g., RAM, floppy disk, etc. Accordingly, among other things, the present invention is directed to a machine-readable medium including machine executable instructions for causing a machine, e.g., processor and associated hardware, to perform one or more of the steps of the above-described method(s).

Numerous additional embodiments, within the scope of the present invention, will be apparent to those of ordinary skill in the art in view of the above description and the claims which follow.

What is claimed is:

1. An apparatus for monitoring a communications system, comprising:
    a receiver that receives information corresponding to nodes in a network, said nodes including at least a first node, said information corresponding to nodes in the network including at least first information relating to a first network portion which includes customer premise devices which communicate via said first node with other devices, said first information including open work order information indicating, for the first node, a number of trouble work orders that remain open at the end of a work order monitoring interval, said first information further including at least offline device information, first communication error information, and first signal level variance information, said offline device information including first offline device information corresponding to customer premise devices of a first type and second offline device information corresponding to customer premise devices of a second type;
    a control circuit that controls processing of information corresponding to nodes in said network;
    a node condition score generation circuit that generates sets of node condition scores for nodes specified by said control circuit, said sets of node condition scores including at least a first set of node condition scores corresponding to the first node, said first set of node condition scores generated by said node condition score generation circuit including an open work order score corresponding to the first node, a first offline device score based on said first offline device information, a first error score based on the first communications error information, and a first signal level variance score based on the first signal level variance information, said node condition score generation circuit including: i) a determination circuit that determines the average number of devices of the first type which were offline during a period of time including multiple offline measurement time intervals; and ii) an offline device score determination circuit that sets said first offline device score to zero, as part of generating said first offline device score, when said measured number of devices of the first type which were offline during an offline measurement period of interest is less than said average number of devices of the first type which were offline;
    an overall node health score generation circuit that generates overall node health scores for nodes specified by said control circuit, said overall node health scores including an overall first node health score corresponding to said first node generated by said overall node health score generation circuit based on a weighted combination of the open work order score corresponding to the first node, first offline device score, first error score and first signal level variance score included in said first set of node condition scores;
    memory for storing overall node health scores generated by said overall node health score generation circuit; and
    a transmitter that transmits said overall first node heath score over the Internet to a portable device used by a maintenance person.

2. The apparatus of claim 1,
    wherein said offline device information includes a measured number of offline devices of a first type; and
    wherein said node condition score circuit generates said first offline device score based on i) the measured number of offline devices of the first type, said measured number of offline devices of the first type being a number of devices of the first type which were offline during an offline measurement period of interest for which the first offline device score is generated and ii) said average number of devices of the first type which were offline during said period of time including multiple offline measurement time intervals.

3. The apparatus of claim 1, wherein said node condition score generation circuit includes a standard deviation determination circuit that determines a standard deviation of the number of devices of the first type which were offline during said period of time including said multiple offline measurement time intervals; and
    wherein said offline device score generation circuit sets said first offline device score to the number of devices of the first type which were offline during said offline measurement period of interest minus said average number of offline devices of the first type divided by said standard deviation of the number of devices of the first type which were offline during said period of time including said multiple offline measurement time intervals, when the number of devices of the first type which were offline during said period of time including said multiple offline measurement time intervals is equal to or greater than said average number of devices of the first type which were offline.

4. The apparatus of claim 1, wherein said overall node health score generation circuit includes a weighted sum generation circuit that generates a weighted sum of scores included in said first set of node condition scores.

5. The apparatus of claim 1, wherein said overall node health score generation circuit includes a weighted sum generation circuit that generates a weighted sum of scores from said open work order score corresponding to the first node and the first offline device score.

6. The apparatus of claim 5, wherein the offline device score determination circuit subtracts from said measured number of devices of the first type which were offline during the offline measurement period of interest said determined average number of devices of the first type which were offline during the period of time including multiple offline measurement time intervals.

7. The apparatus of claim 5, wherein the overall node health score generation circuit multiplies the open work order score by a first weight and the offline device score by a second weight as part of generating the overall node health score.

8. The apparatus of claim 1, wherein the offline device score determination circuit subtracts from said measured number of devices of the first type which were offline during the offline measurement period of interest said determined average number of devices of the first type which were offline during the period of time including multiple offline measurement time intervals.

9. A communications network monitoring system, comprising:
- a receiver that receives information corresponding to network nodes in a communications network, said network nodes including at least a first network node via which customer premise devices communicate with other devices in the communications network, said information including at least first information, said first information including: i) open work order information indicating, for the first network node, a number of trouble work orders that remain open at the end of a work order monitoring interval, ii) first communication error information, iii) first signal level variance information and iv) offline device information, said offline device information including first offline device information corresponding to customer premise devices of a first type and second offline device information corresponding to customer premise devices of a second type;
- a control circuit that controls processing of information corresponding to network nodes in said network;
- a node condition score generation circuit that generates sets of node condition scores for nodes specified by said control circuit, said sets of node condition scores including at least a first set of node condition scores corresponding to the first network node, said first set of node condition scores including an open work order score corresponding to the first network node, a first offline device score based on said first offline device information, a first error score based on the first communications error information, and a first signal level variance score based on the first signal level variance information;
- an overall node health score generation circuit that generates overall node health scores for nodes specified by said control circuit, said overall node health scores including an overall first node health score corresponding to said first network node generated by said overall node health score generation circuit based on a weighted combination of the open work order score corresponding to the first network node, the first offline device score, first error score and first signal level variance score included in said first set of node condition scores;
- memory for storing overall node health scores generated by said overall node health score generation circuit;
- a transmitter that transmits said overall first node health score over the Internet to a portable device used by a maintenance person; and
- wherein the node condition score generation circuit includes an offline device score determination circuit which subtracts from a measured number of devices of a first type which were offline during an offline measurement period of interest a determined average number of devices of the first type which were offline during a period of time including multiple offline measurement time intervals to generate the first offline device score.

10. The system of claim 9, further comprising:
said portable device, wherein said portable device is a cell phone of the maintenance person, said cell phone displaying said overall first node health score to the maintenance person.

* * * * *